(12) United States Patent
Zhang et al.

(10) Patent No.: US 10,996,437 B2
(45) Date of Patent: May 4, 2021

(54) IMAGING LENS ASSEMBLY

(71) Applicant: Zhejiang Sunny Optical Co., Ltd, Ningbo (CN)

(72) Inventors: Kaiyuan Zhang, Ningbo (CN); Jianke Wenren, Ningbo (CN); Ming Li, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 470 days.

(21) Appl. No.: 16/067,098

(22) PCT Filed: Sep. 20, 2017

(86) PCT No.: PCT/CN2017/102427
§ 371 (c)(1),
(2) Date: Jun. 28, 2018

(87) PCT Pub. No.: WO2018/192165
PCT Pub. Date: Oct. 25, 2018

(65) Prior Publication Data
US 2021/0048622 A1 Feb. 18, 2021

(30) Foreign Application Priority Data

Apr. 18, 2017 (CN) .......................... 201710253196.9
Apr. 18, 2017 (CN) .......................... 201720406886.9

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS

| | | | |
|---|---|---|---|
| 2013/0050847 A1 | 2/2013 | Hsu et al. | |
| 2013/0162883 A1* | 6/2013 | Tamura | G02B 13/001 348/345 |
| 2016/0363741 A1 | 12/2016 | Kwon | |

FOREIGN PATENT DOCUMENTS

| | | |
|---|---|---|
| CN | 202486401 | 10/2012 |
| CN | 204515223 | 7/2015 |
| CN | 206757160 | 12/2017 |

* cited by examiner

*Primary Examiner* — Wen Huang
(74) *Attorney, Agent, or Firm* — Hauptman Ham, LLP

(57) ABSTRACT

The present disclosure discloses an imaging lens assembly. The imaging lens assembly includes sequentially, from an object side to an image side along an optical axis, a first lens, a second lens, a third lens, a fourth lens and a fifth lens. The first lens has a positive refractive power, an object-side surface of the first lens is a convex surface, and an image-side surface of the first lens is a convex surface; the second lens has a negative refractive power; the third lens has a positive refractive power, an object-side surface of the third lens is a convex surface, and an image-side surface of the third lens is a convex surface; the fourth lens has a positive refractive power; and the fifth lens has a negative refractive power, and a surface tilt angle β5 of an object-side surface of the fifth lens at a maximum effective radius satisfies: $-20° < \beta5 < 5°$.

17 Claims, 20 Drawing Sheets

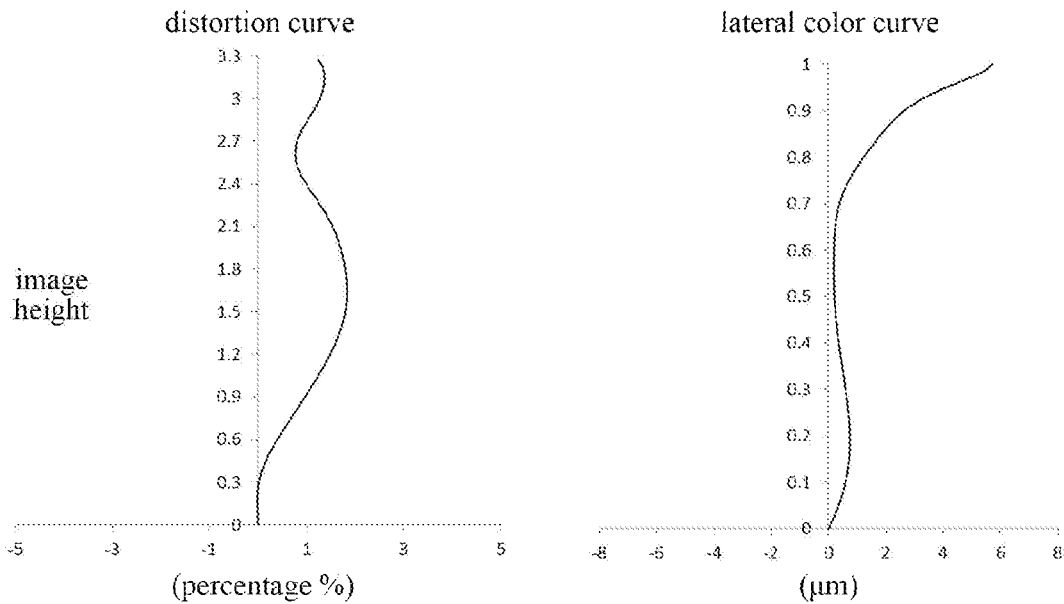
Fig. 2C
Fig. 2D
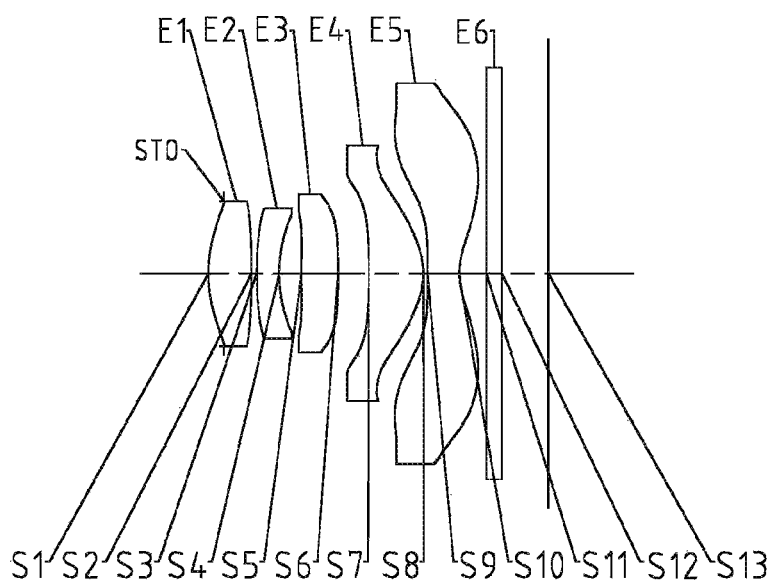
Fig. 3

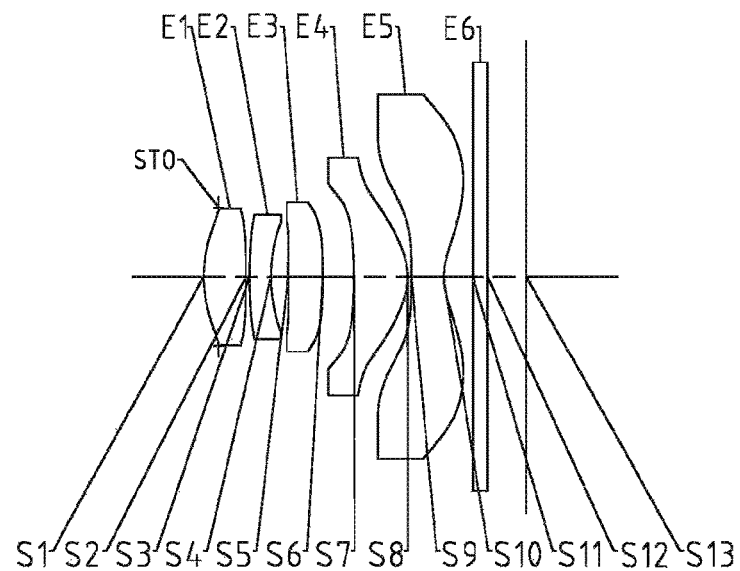
Fig. 5
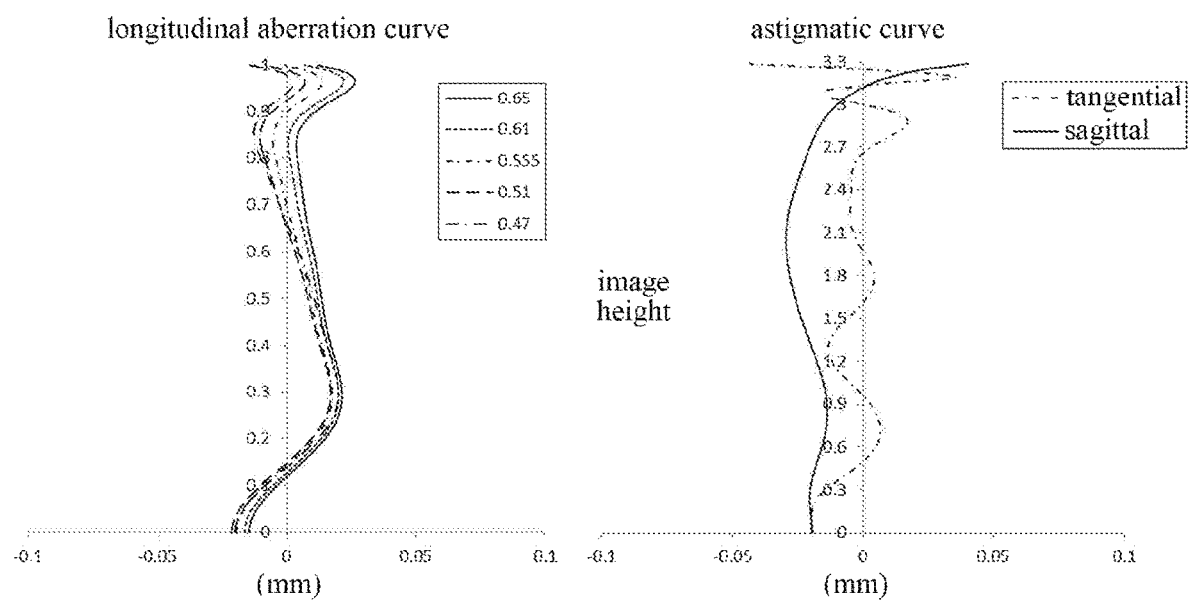
Fig. 6A
Fig. 6B

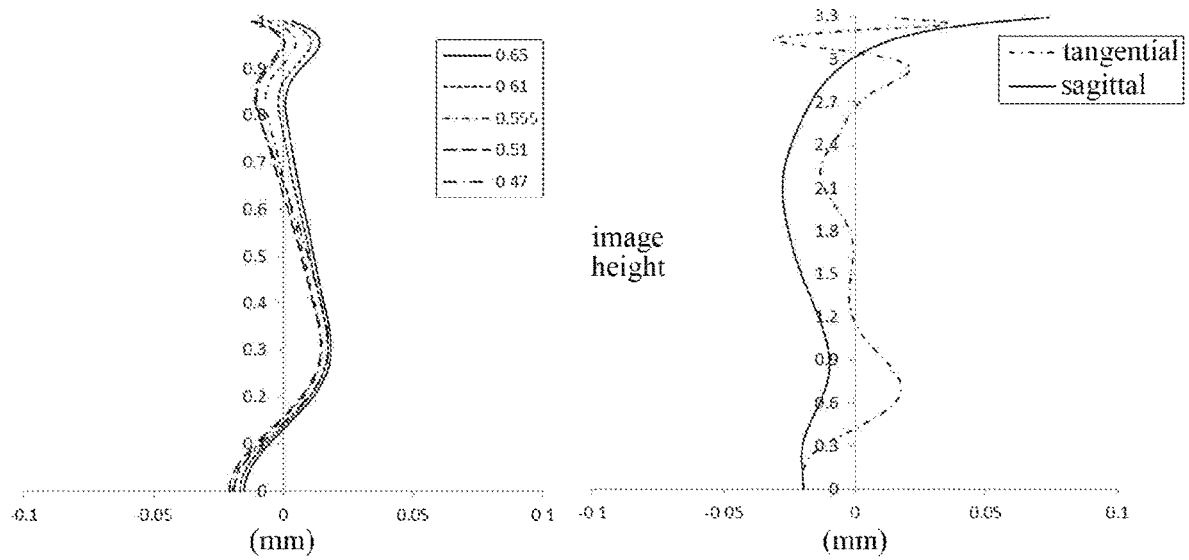
Fig. 8A
Fig. 8B
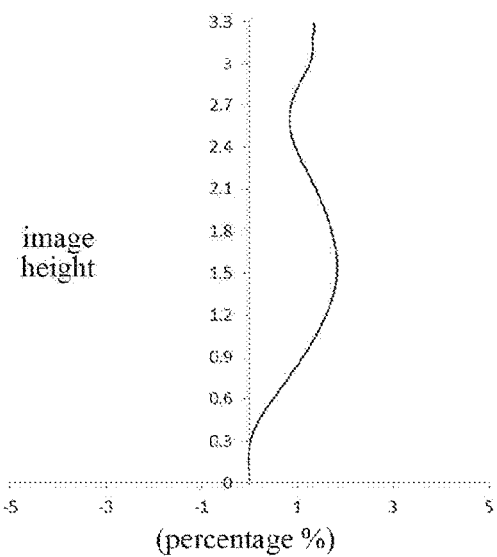
Fig. 8C
Fig. 8D

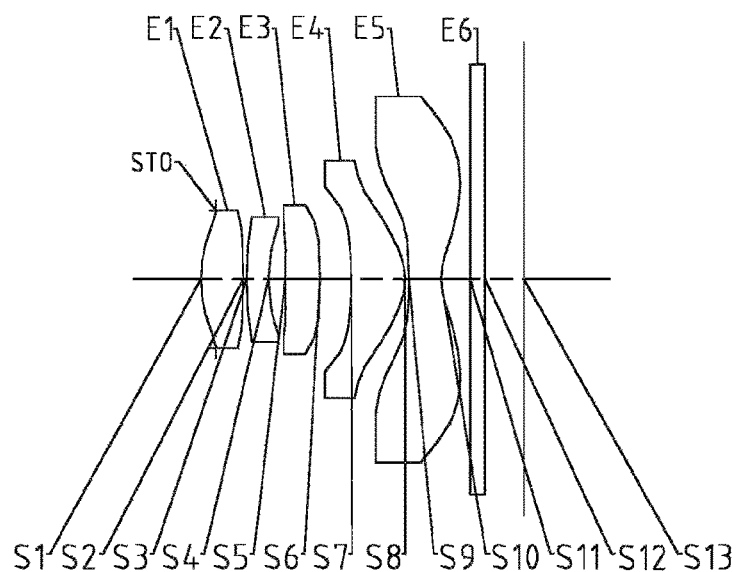
Fig. 13
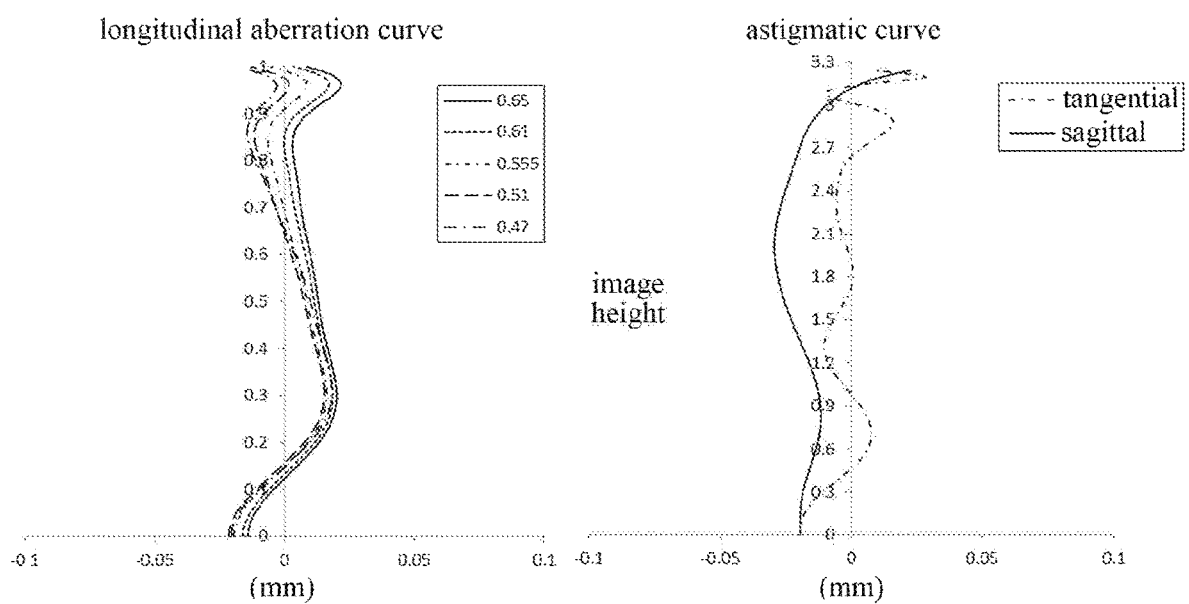
Fig. 14A
Fig. 14B

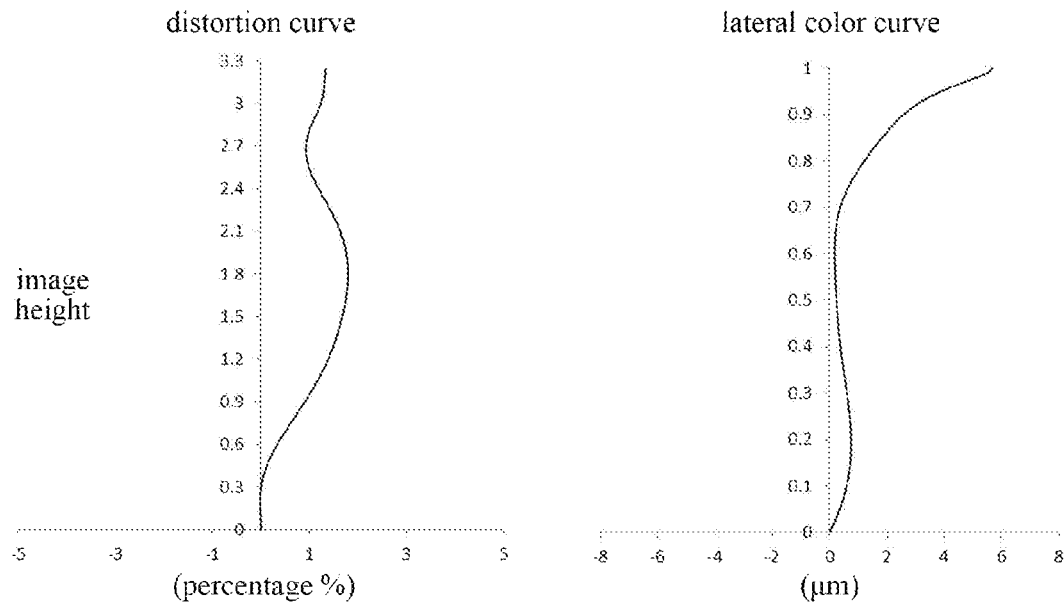
Fig. 14C
Fig. 14D
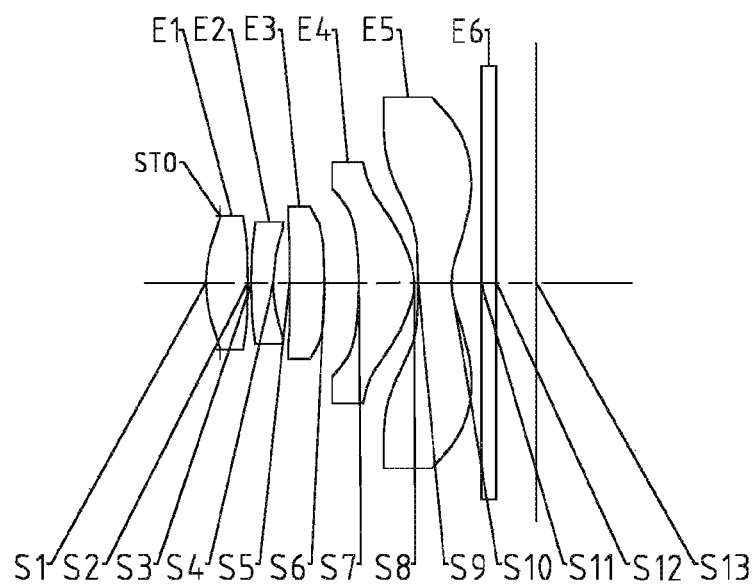
Fig. 15

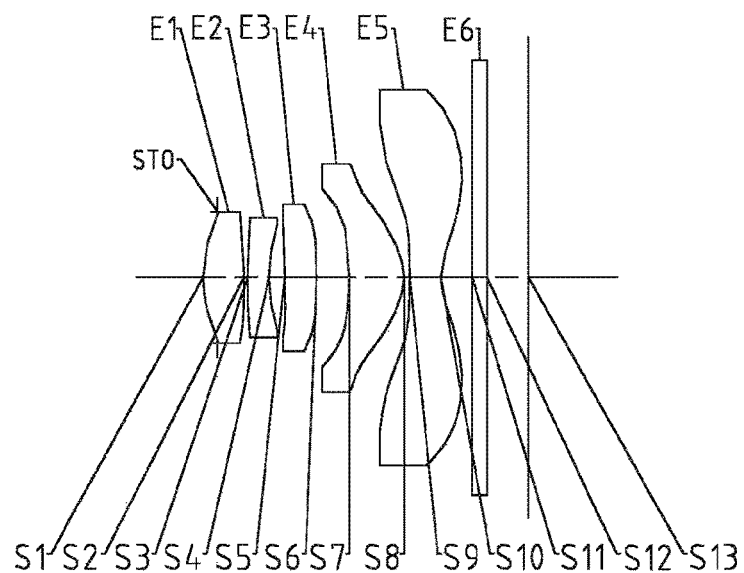
Fig. 17
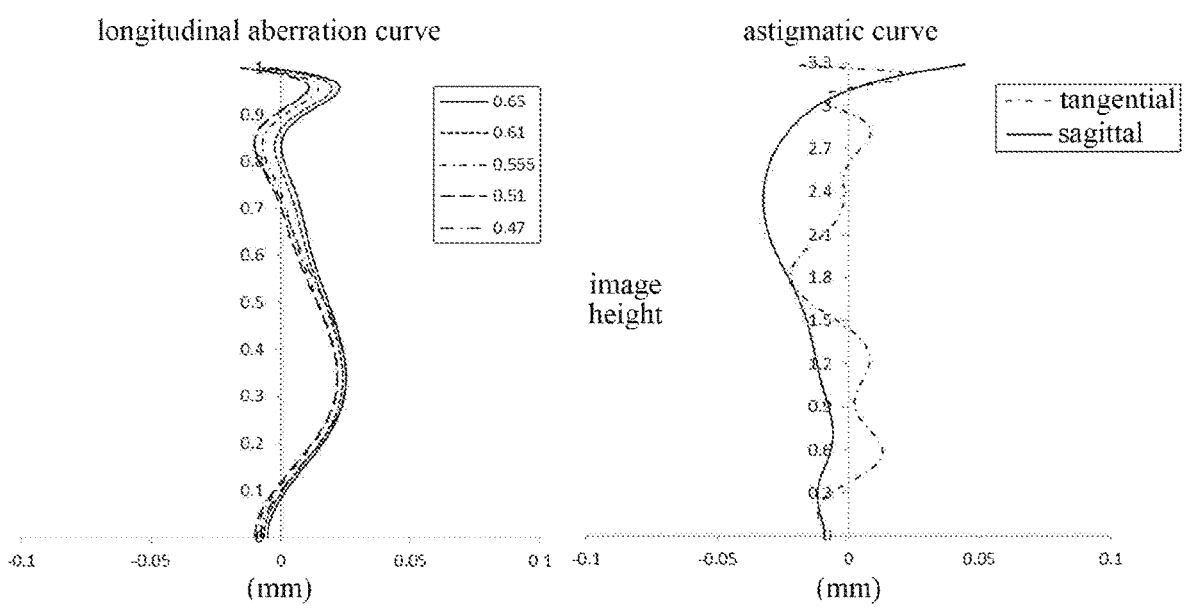
Fig. 18A
Fig. 18B

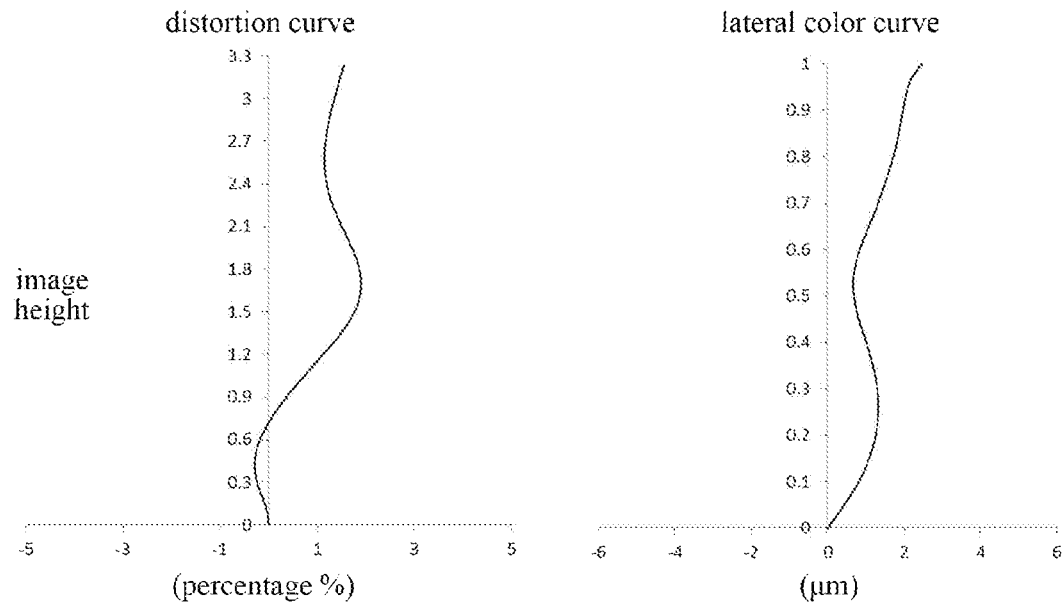
Fig. 22C
Fig. 22D
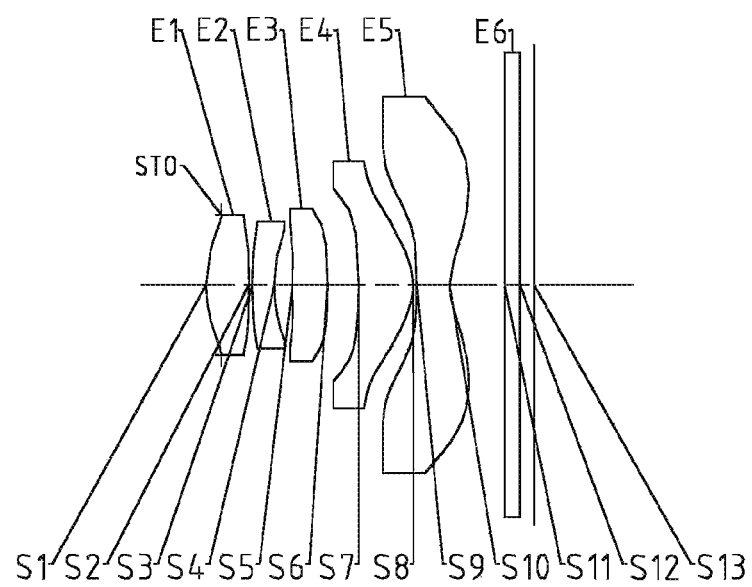
Fig. 23

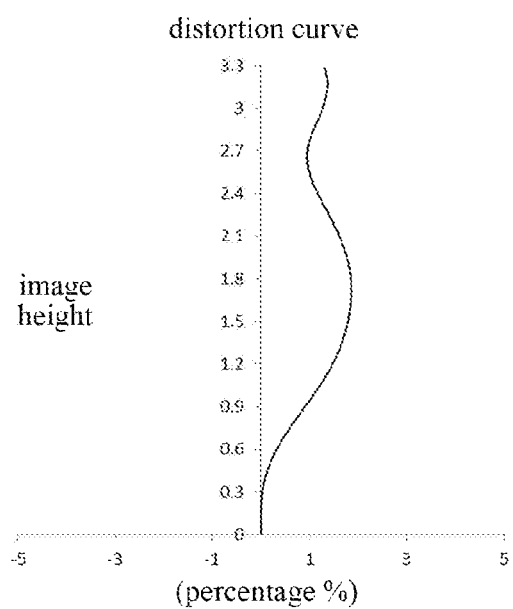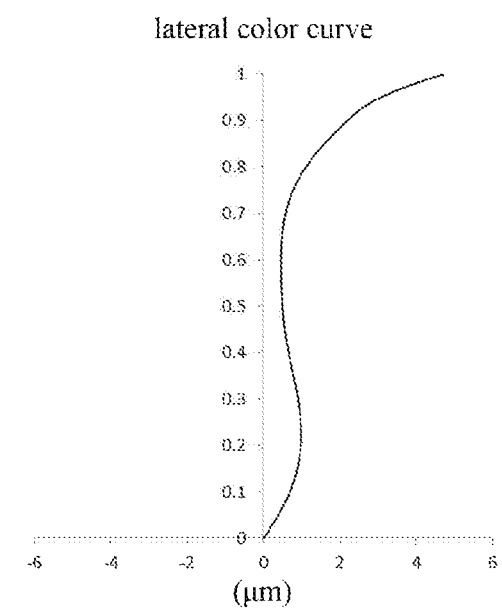
Fig. 26C
Fig. 26D

IMAGING LENS ASSEMBLY

RELATED APPLICATIONS

The present application is a National Phase of International Application Number PCT/CN2017/102427, filed Sep. 20, 2017, and claims the priority of China Application No. 201710253196.9, filed Apr. 18, 2017; and China Application No. 201720406886.9, filed Apr. 18, 2017.

TECHNICAL FIELD

The present disclosure relates to an imaging lens assembly, and more specifically to an imaging lens assembly including five lenses.

BACKGROUND

In recent years, as the science and technology develop, portable electronic products are gradually emerging, and portable electronic products having camera functions are increasingly liked by people. Therefore, there is an increasing market demand for camera lens assemblies suitable for the portable electronic products. Since the portable electronic products tend to be miniaturized, the total length of the lens assembly is limited, thereby increasing the difficulty in designing the lens assembly. Currently, an often used photosensitive element in the camera lens assembly is generally a CCD (charge-coupled device) or a CMOS (complementary metal-oxide semiconductor). As the CCD and CMOS elements are having higher performances and smaller sizes, higher requirements on high image quality and miniaturization of the counterpart camera lens assemblies have been brought forward.

To satisfy the miniaturization requirement, a typical configuration of an existing lens assembly has an F-number Fno (effective focal length of a lens assembly/entrance pupil diameter of a lens assembly) of 2.0 or above, to possess a good optical performance while realizing the reduction in size of the lens assembly. However, with the constant development of smart phones and other portable electronic products, higher requirements on camera lens assemblies are brought forward, especially in situations such as lack of light (e.g., cloudy and rainy days, dusk, etc.) and hand trembling, thus the F-number Fno of 2.0 or above has been unable to meet higher order imaging requirements.

Therefore, there is a need for an imaging lens assembly applicable to the portable electronic products, having a large ultra-thin aperture and a good image quality.

SUMMARY

The technical solution provided by the present disclosure at least partially solves the technical problems described above.

According to an aspect, the present disclosure provides an imaging lens assembly. The imaging lens assembly includes sequentially, from an object side to an image side along an optical axis, a first lens, a second lens, a third lens, a fourth lens and a fifth lens. The first lens has a positive refractive power, an object-side surface of the first lens is a convex surface, and an image-side surface of the first lens is a convex surface. The second lens has a negative refractive power. The third lens has a positive refractive power, an object-side surface of the third lens is a convex surface, and an image-side surface of the third lens is a convex surface. The fourth lens has a positive refractive power. The fifth lens has a negative refractive power, and a surface tilt angle $\beta 5$ of an object-side surface of the fifth lens at a maximum effective radius may satisfy: $-20°<\beta 5<5°$.

In an implementation, a total effective focal length f of the imaging lens assembly and an entrance pupil diameter EPD may satisfy: f/EPD≤1.9.

In the present disclosure, multiple lenses (e.g., five lenses) are used. By reasonably distributing the relationship between the total effective focal length and the entrance pupil diameter of the imaging lens assembly, the system has a large-aperture advantage in the process of increasing the amount of light admitted, thereby enhancing an imaging effect in a dark environment. Meanwhile, aberrations of an edge field-of-view are reduced.

According to another aspect, the present disclosure further provides an imaging lens assembly. The imaging lens assembly includes sequentially, from an object side to an image side along an optical axis, a first lens, a second lens, a third lens, a fourth lens and a fifth lens. The first lens has a positive refractive power, an object-side surface of the first lens is a convex surface, and an image-side surface of the first lens is a convex surface. The second lens has a negative refractive power, and a maximum surface tilt angle $\beta 2$ of an object-side surface of the second lens satisfies: $\beta 2<30°$. The third lens has a positive refractive power, an object-side surface of the third lens is a convex surface, and an image-side surface of the third lens is a convex surface. The fourth lens has a positive refractive power. The fifth lens has a negative refractive power.

In an implementation, the total effective focal length f of the imaging lens assembly and an effective focal length f4 of the fourth lens may satisfy: 1.8<f/f4<2.5.

In an implementation, an effective focal length f1 of the first lens and an effective focal length f5 of the fifth lens may satisfy: $-2.5<f1/f5\le-2.0$.

In an implementation, the total effective focal length f of the imaging lens assembly and an effective focal length f2 of the second lens may satisfy: $-1.0<f/f2<-0.5$.

In an implementation, a combined focal length f12 of the first lens and the second lens and an effective focal length f3 of the third lens may satisfy: 0<f12/f3<1.0.

In an implementation, a radius of curvature R1 of the object-side surface of the first lens and a radius of curvature R2 of the image-side surface of the first lens may satisfy: $-1.0<(R1+R2)/(R1-R2)<0$.

In an implementation, a radius of curvature R5 of the object-side surface of the third lens and a radius of curvature R6 of the image-side surface of the third lens may satisfy: $-1.0<R5/R6<0$.

In an implementation, the total effective focal length f of the imaging lens assembly and a center thickness CT5 of the fifth lens may satisfy: 7.0≤f/CT5<9.0.

In an implementation, a distance TTL from the object-side surface of the first lens to an image plane of the imaging lens assembly on the optical axis and half of a diagonal length ImgH of an effective pixel area on the image plane of the imaging lens assembly may satisfy: TTL/ImgH≤1.6.

The imaging lens assembly with the above configuration may further have at least one of the beneficial effects of miniaturization, high image quality, low sensitivity, balanced aberration, better flat field curvature ability, better distortion elimination ability, and so on.

BRIEF DESCRIPTION OF THE DRAWINGS

The above and other advantages of the implementations of the present disclosure will become apparent through the detailed description made with reference to the following accompanying drawings, which are intended to illustrate exemplary implementations of the present disclosure rather than limit the exemplary implementations. In the accompanying drawings:

FIG. 2C illustrates a distortion curve of the imaging lens assembly according to Embodiment 1;

FIG. 2D illustrates a lateral color curve of the imaging lens assembly according to Embodiment 1;

FIG. 3 is a schematic structural diagram illustrating an imaging lens assembly according to Embodiment 2 of the present disclosure;

FIG. 5 is a schematic structural diagram illustrating an imaging lens assembly according to Embodiment 3 of the present disclosure;

FIG. 6A illustrates a longitudinal aberration curve of the imaging lens assembly according to Embodiment 3;

FIG. 6B illustrates an astigmatic curve of the imaging lens assembly according to Embodiment 3;

FIG. 8A illustrates a longitudinal aberration curve of the imaging lens assembly according to Embodiment 4;

FIG. 8B illustrates an astigmatic curve of the imaging lens assembly according to Embodiment 4;

FIG. 8C illustrates a distortion curve of the imaging lens assembly according to Embodiment 4;

FIG. 8D illustrates a lateral color curve of the imaging lens assembly according to Embodiment 4;

FIG. 13 is a schematic structural diagram illustrating an imaging lens assembly according to Embodiment 7 of the present disclosure;

FIG. 14A illustrates a longitudinal aberration curve of the imaging lens assembly according to Embodiment 7;

FIG. 14B illustrates an astigmatic curve of the imaging lens assembly according to Embodiment 7;

FIG. 14C illustrates a distortion curve of the imaging lens assembly according to Embodiment 7;

FIG. 14D illustrates a lateral color curve of the imaging lens assembly according to Embodiment 7;

FIG. 15 is a schematic structural diagram illustrating an imaging lens assembly according to Embodiment 8 of the present disclosure;

FIG. 17 is a schematic structural diagram illustrating an imaging lens assembly according to Embodiment 9 of the present disclosure;

FIG. 18A illustrates a longitudinal aberration curve of the imaging lens assembly according to Embodiment 9;

FIG. 18B illustrates an astigmatic curve of the imaging lens assembly according to Embodiment 9;

FIG. 22C illustrates a distortion curve of the imaging lens assembly according to Embodiment 11;

FIG. 22D illustrates a lateral color curve of the imaging lens assembly according to Embodiment 11;

FIG. 23 is a schematic structural diagram illustrating an imaging lens assembly according to Embodiment 12 of the present disclosure;

FIG. 26C illustrates a distortion curve of the imaging lens assembly according to Embodiment 13; and FIG. 26D illustrates a lateral color curve of the imaging lens assembly according to Embodiment 13.

DETAILED DESCRIPTION OF EMBODIMENTS

Figure 1:
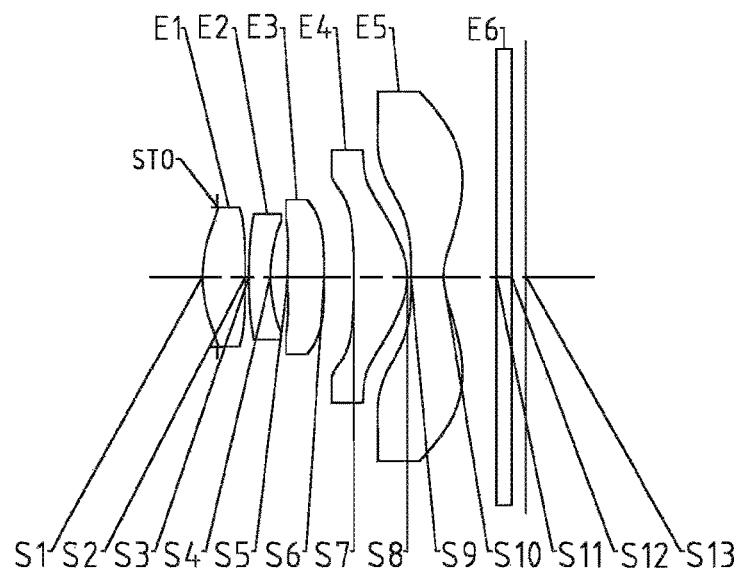
FIG. 1 is a schematic structural diagram illustrating an imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" are only used to distinguish one feature from another, rather than represent any limitations to the feature. Thus, the first lens discussed below may also be referred to as the second lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

It should be further understood that the terms "comprising," "including," "having" and variants thereof, when used in the specification, specify the presence of stated features, entireties, steps, operations, elements and/or components, but do not exclude the presence or addition of one or more other features, entireties, steps, operations, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

As used herein, the terms "substantially," "about" and similar terms are used as a term of approximation rather than a term of degree, and are intended to account for the inherent deviations in measured or calculated values recognized by those of ordinary skill in the art.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The present disclosure is further described below in combination with the specific embodiments.

An imaging lens assembly according to exemplary implementations of the present disclosure has, for example, five lenses (i.e., a first lens, a second lens, a third lens, a fourth lens and a fifth lens). The five lenses are arranged in sequence from an object side to an image side along an optical axis.

In the exemplary implementations, the first lens may have a positive refractive power, an object-side surface of the first lens is a convex surface, and an image-side surface of the first lens is a convex surface; the second lens may have a negative refractive power; the third lens may have a positive refractive power, an object-side surface of the third lens is a convex surface, and an image-side surface of the third lens is a convex surface; the fourth lens may have a positive refractive power; and the fifth lens may have a negative refractive power. By reasonably controlling the distribution of the positive and negative refractive powers of the various lenses in the system, low-order aberrations of the system may be effectively balanced and controlled, so as to make the system obtain a better image quality.

A total effective focal length f of the imaging lens assembly and an effective focal length f4 of the fourth lens may satisfy: $1.8<f/f4<2.5$, and more specifically, f and f4 may further satisfy: $1.97 \leq f/f4 \leq 2.20$. By reasonably distributing the refractive power of the fourth lens, it can effectively control aberrations related to the field-of-view such as the field curvature and the distortion, thereby obtaining an improved image quality. An effective focal length f1 of the first lens and an effective focal length f5 of the fifth lens may satisfy: $-2.5<f1/f5 \leq -2.0$, and more specifically, f1 and f5 may further satisfy: $-2.31 \leq f1/f5 \leq -2.00$. By reasonably distributing the refractive power of the first lens, a comatic aberration of the optical system can be effectively controlled. The total effective focal length f of the imaging lens assembly and an effective focal length f2 of the second lens may satisfy: $-1.0<f/f2<-0.5$, and more specifically, f and f2 may further satisfy: $-0.81 \leq f/f2 \leq -0.61$. By reasonably distributing the refractive power of the second lens, the system generates a positive spherical aberration to balance the low-order aberrations of the system, so that the system obtains a better processability. A combined focal length f12 of the first lens and the second lens and an effective focal length f3 of the third lens may satisfy: $0<f12/f3<1.0$, and more specifically, f12 and f3 may further satisfy: $0.44 \leq f12/f3 \leq 0.63$. A combined refractive power of the first lens and the second lens is positive. By properly arranging the refractive powers of the first lens, the second lens and the third lens, the total refractive power of the entire optical system is controlled.

The total effective focal length f of the imaging lens assembly and an entrance pupil diameter EPD of the imaging lens assembly may satisfy: $f/EPD \leq 1.9$, and more specifically, the total effective focal length f and the entrance pupil diameter EPD may further satisfy: $1.78 \leq f/EPD \leq 1.90$.

By configuring the imaging lens assembly to satisfy f/EPD≤1.9, the system may have a large-aperture advantage in the process of increasing the amount of light admitted, thereby enhancing an imaging effect in a dark environment while reducing aberrations of the edge field-of-view.

A surface tilt angle β5 of an object-side surface of the fifth lens at a maximum effective radius of the imaging lens assembly according to the exemplary implementations of the present disclosure may satisfy: −20°<β5<5°, and more specifically, the surface tilt angle β5 of the object-side surface of the fifth lens at the maximum effective radius may further satisfy: −14.25°≤β5≤4.02°. In addition, a maximum surface tilt angle R2 of an object-side surface of the second lens may satisfy: β2<30°, and more specifically, the maximum surface tilt angle β2 of the object-side surface of the second lens may further satisfy: 19.01°≤β2≤27.53°. By properly arranging the surface tilt angles of the object-side surface of the fifth lens and the object-side surface of the second lens, the sensitive surfaces obtain a better processability to realize a better processability of the optical system.

In the application, the radius of curvature of each mirror surface may be optimized. For example, a radius of curvature R1 of the object-side surface of the first lens and a radius of curvature R2 of the image-side surface of the first lens may satisfy: −1.0<(R1+R2)/(R1−R2)<0, and R1 and R2 may further satisfy: −0.84≤(R1+R2)/(R1−R2)≤−0.61. By properly configuring the range of the radius of curvature of the first lens, the amount of astigmatism of the optical system is effectively controlled. As another example, a radius of curvature R5 of the object-side surface of the third lens and a radius of curvature R6 of the image-side surface of the third lens may satisfy: −1.0<R5/β6<0, and more specifically, R5 and R6 may further satisfy: −0.98≤R5/R6≤−0.60. By controlling the curvature direction of the radius of curvature of the third lens in the middle, the field curvature of the optical system is effectively controlled, so as to improve the image quality of the system.

In order to effectively control the amount of distortion of the system, a center thickness of the fifth lens may be properly configured. The total effective focal length f of the imaging lens assembly and the center thickness CT5 of the fifth lens may satisfy: 7.0≤f/CT5<9.0, and more specifically, f and CT5 may further satisfy: 7.07≤f/CT≤8.30.

In addition, a distance TTL from the object-side surface of the first lens to an image plane of the imaging lens assembly on the optical axis and half of a diagonal length ImgH of an effective pixel area on the image plane of the imaging lens assembly may satisfy: TTL/ImgH≤1.6, for example, TTL and ImgH may further satisfy: 1.37≤TTL/ImgH≤1.45. By controlling the ratio of the total track length of the lens assembly to the image height, the total size of the imaging lens assembly may be effectively compressed to realize the ultra-thin characteristic and miniaturization of the imaging lens assembly, so that the above imaging lens assembly can be better applicable to, for example, size-restricted systems such as portable electronic products.

In the exemplary implementations, the imaging lens assembly may also be provided with an aperture STO for limiting light beams to adjust the amount of light admitted. It should be understood by those skilled in the art that the aperture STO may be set at any position of the lens as needed, that is, the arrangement of the aperture STO should not be limited to the positions shown in the accompanying drawings.

The imaging lens assembly according to the above implementations of the present disclosure may use multiple lenses, for example, five lenses described above. By properly distributing the refractive powers and the surface types of the lenses, the center thicknesses of the lenses, the axial spacing distances between the lenses, etc., it is possible to effectively enlarge the aperture of the imaging lens assembly, reduce the sensitivity of the system, ensure the miniaturization of the lens assembly and improve the image quality, thus making the imaging lens assembly more conducive to the production and processing and applicable to the portable electronic products. In the implementations of the present disclosure, at least one of the mirror surfaces of the lenses is an aspheric mirror surface. The aspheric lens is characterized in that its curvature continuously changes from the center of the lens to the periphery. In contrast to a spherical lens having a constant curvature from the center of the lens to the periphery, the aspheric lens has a better radius-of-curvature characteristic, and has advantages of improving a distortion aberration and an astigmatic aberration, thus enabling the field-of-view to become larger and more realistic. The use of the aspheric lens can eliminate as much as possible the aberrations that occur during the imaging, thereby improving the image quality. Moreover, the use of the aspheric lens may also effectively reduce the number of the lenses in the optical system.

However, it should be understood by those skilled in the art that the various results and advantages described in the present specification may be obtained by changing the number of the lenses forming the lens assembly without departing from the technical solution claimed by the present disclosure. For example, although five lenses are described as an example in the implementations, the imaging lens assembly is not limited to include five lenses. If desired, the imaging lens assembly may also include other numbers of lenses.

Specific embodiments of the imaging lens assembly that may be applied to the above implementations are further described below with reference to the accompanying drawings.

Embodiment 1

An imaging lens assembly according to Embodiment 1 of the present disclosure is described below with reference to FIGS. 1-2D. FIG. 1 is a schematic structural diagram illustrating the imaging lens assembly according to Embodiment 1 of the present disclosure.

As shown in FIG. 1, the imaging lens assembly includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the imaging lens assembly may further include an optical filter E6 having an object-side surface S11 and an image-side surface S12, and the optical filter E6 may be used to correct color deviations. In the imaging lens assembly of this embodiment, an aperture STO for limiting light beams may also be provided. Light from an object sequentially passes through the surfaces S1-S12 and finally forms an image on an image plane 13.

Table 1 shows the surface type, the radius of curvature, the thickness, the material and the conic coefficient of each lens of the imaging lens assembly in Embodiment 1.

TABLE 1

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.2088 | | | |
| S1 | aspheric | 1.8326 | 0.5927 | 1.546 | 56.11 | −2.5405 |
| S2 | aspheric | −18.0881 | 0.0505 | | | 62.1965 |
| S3 | aspheric | 5.4508 | 0.3000 | 1.666 | 20.37 | 7.6459 |
| S4 | aspheric | 2.0526 | 0.2401 | | | 0.8932 |
| S5 | aspheric | 10.7275 | 0.5021 | 1.546 | 56.11 | 88.4223 |
| S6 | aspheric | −13.8626 | 0.4232 | | | 98.4468 |
| S7 | aspheric | −9.0769 | 0.7425 | 1.536 | 55.77 | −65.7660 |
| S8 | aspheric | −0.8377 | 0.0500 | | | −4.7763 |
| S9 | aspheric | −42.4588 | 0.4495 | 1.546 | 56.11 | 30.7301 |
| S10 | aspheric | 0.7806 | 0.7382 | | | −6.0203 |
| S11 | spherical | infinite | 0.2069 | 1.517 | 64.17 | |
| S12 | spherical | infinite | 0.2042 | | | |
| S13 | spherical | infinite | | | | |

As may be obtained from Table 1, the radius of curvature R1 of the object-side surface S1 of the first lens E1 and the radius of curvature R2 of the image-side surface S2 of the first lens E1 satisfy: (R1+R2)/(R1−R2)=−0.82; and the radius of curvature R5 of the object-side surface S5 of the third lens E3 and the radius of curvature R6 of the image-side surface S6 of the third lens E3 satisfy: R5/β6=−0.77.

In this embodiment, as an example, five lenses are used. By properly distributing the focal length and the surface type of each lens, the aperture of the lens assembly is effectively enlarged, the total length of the lens assembly is shortened, thereby ensuring the large aperture and the miniaturization of the lens assembly. Meanwhile, various types of aberrations are corrected, thereby improving the resolution and the image quality of the lens assembly. The surface type x of each aspheric surface is defined by the following formula:

$$x = \frac{ch^2}{1+\sqrt{1-(k+1)c^2h^2}} + \sum A_i h^i. \quad (1)$$

Here, x is the distance sagittal height to the vertex of the aspheric surface when the aspheric surface is at a position of a height h along the optical axis; c is the paraxial curvature of the aspheric surface, and c=1/R (i.e., the paraxial curvature c is the reciprocal of the radius of curvature R in Table 1 above); k is the conic coefficient (given in Table 1 above); and Ai is the correction coefficient of the $i^{th}$ order of the aspheric surface. Table 2 below shows the high-order coefficients $A_4$, $A_6$, $A_8$, $A_{10}$, $A_{12}$, $A_{16}$, $A_{18}$ and $A_{20}$ applicable to the mirror surfaces S1-S10 in Embodiment 1.

Table 3 below shows the effective focal lengths f1-f5 of the lenses, the total effective focal length f of the imaging lens assembly, the distance TTL from the object-side surface S1 of the first lens E1 to the image plane S13 of the imaging lens assembly on the optical axis, and the half of the maximal field-of-view HFOV of the imaging lens assembly in Embodiment 1.

TABLE 3

| f1(mm) | 3.08 | f(mm) | 3.43 |
|---|---|---|---|
| f2(mm) | −5.12 | TTL(mm) | 4.50 |
| f3(mm) | 11.16 | HFOV(°) | 43.2 |
| f4(mm) | 1.67 | | |
| f5(mm) | −1.40 | | |

According to Table 3, the total effective focal length f of the imaging lens assembly and the effective focal length f4 of the fourth lens E4 satisfy: f/f4=2.06; the effective focal length f1 of the first lens E1 and the effective focal length f5 of the fifth lens E5 satisfy: f1/f5=−2.20; and the total effective focal length f of the imaging lens assembly and the effective focal length f2 of the second lens E2 satisfy: f/f2=−0.67. Combining Table 1 and Table 3, it may be obtained that the total effective focal length f of the imaging lens assembly and the center thickness CT5 of the fifth lens E5 satisfy: f/CT5=7.64.

In this embodiment, the total effective focal length f of the imaging lens assembly and the entrance pupil diameter EPD of the imaging lens assembly satisfy: f/EPD=1.78; the surface tilt angle β5 of the object-side surface S9 of the fifth lens E5 at the maximum effective radius satisfies: β5=1.30;

TABLE 2

| surface number | A4 | A6 | A8 | A10 | A12 | A14 | A16 | A18 | A20 |
|---|---|---|---|---|---|---|---|---|---|
| S1 | 1.1883E−02 | 1.7906E−01 | −1.3362E+00 | 5.2597E+00 | −1.3101E+01 | 2.0432E+01 | −1.9406E+01 | 1.0242E+01 | −2.3031E+00 |
| S2 | −1.5746E−01 | 6.3428E−01 | −1.7586E+00 | 3.2243E+00 | −4.4618E+00 | 4.7150E+00 | −3.7545E+00 | 2.0144E+00 | −5.2782E−01 |
| S3 | −2.0398E−01 | 9.9495E−01 | −3.4286E+00 | 1.0883E+01 | −2.8264E+01 | 5.1799E+01 | −6.0438E+01 | 3.9868E+01 | −1.1292E+01 |
| S4 | −1.1241E−01 | 1.1718E−01 | 1.6886E+00 | −1.1383E+01 | 3.9132E+01 | −8.1478E+01 | 1.0281E+02 | −7.2231E+01 | 2.1714E+01 |
| S5 | −1.7473E−01 | 4.0636E−01 | −2.7338E+00 | 1.1682E+01 | −3.1662E+01 | 5.3284E+01 | −5.3363E+01 | 2.8397E+01 | −5.6674E+00 |
| S6 | −7.4241E−02 | −2.6888E−01 | 1.3254E+00 | −4.4496E+00 | 9.2808E+01 | −1.2318E+01 | 1.0110E+01 | −4.6912E+00 | 9.4928E−01 |
| S7 | 9.4799E−03 | −1.0664E−01 | 2.0805E−01 | −5.1514E−01 | 7.8113E−01 | −7.0186E−01 | 3.6202E−01 | −9.7507E−02 | 1.0566E−02 |
| S8 | −7.0332E−02 | −2.7991E−02 | 1.7214E−01 | −3.0141E−01 | 2.9612E−01 | −1.6177E−01 | 4.9212E−02 | −7.8535E−03 | 5.1451E−04 |
| S9 | −2.2218E−01 | 8.2495E−02 | −3.5167E−02 | 4.4262E−02 | −2.7840E−02 | 8.9506E−03 | −1.5920E−03 | 1.5084E−04 | −5.9878E−06 |
| S10 | −1.3689E−01 | 8.9665E−02 | −4.7687E−02 | 1.8249E−02 | −4.8107E−03 | 8.2336E−04 | −8.5663E−05 | 4.8761E−06 | −1.1591E−07 | the combined focal length f12 of the first lens E1 and the second lens E2 and the effective focal length f3 of the third lens E3 satisfy: f12/f3=0.52; the maximum surface tilt angle β2 of the object-side surface S3 of the second lens E2 satisfies: β2=24.41°; and the distance TTL from the object-side surface S1 of the first lens E1 to the image plane S13 of the imaging lens assembly on the optical axis and the half of the diagonal length ImgH of the effective pixel area on the image plane S13 of the imaging lens assembly satisfy: TTL/ImgH=1.37.

Figures 2A, 2B:
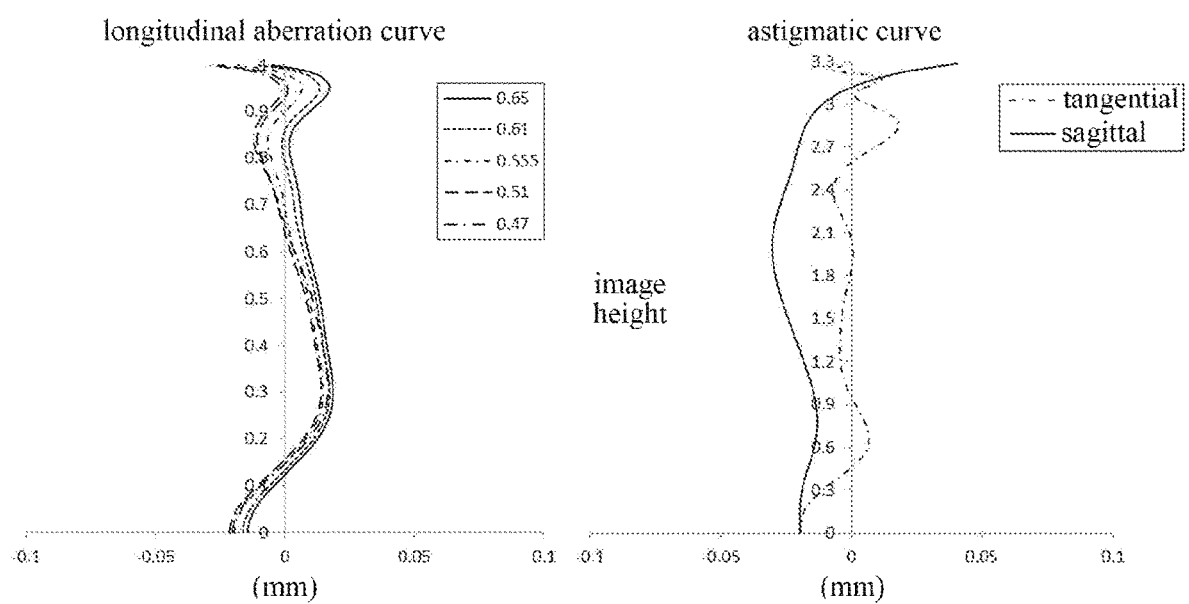
FIG. 2A illustrates a longitudinal aberration curve of the imaging lens assembly according to Embodiment 1.
FIG. 2B illustrates an astigmatic curve of the imaging lens assembly according to Embodiment 1.

FIG. 2A illustrates a longitudinal aberration curve of the imaging lens assembly according to Embodiment 1, representing deviations of focal points of light of different wavelengths converged after passing through an imaging lens assembly. FIG. 2B illustrates an astigmatic curve of the imaging lens assembly according to Embodiment 1, representing a curvature of a tangential image plane and a curvature of a sagittal image plane. FIG. 2C illustrates a distortion curve of the imaging lens assembly according to Embodiment 1, representing amounts of distortion at different viewing angles. FIG. 2D illustrates a lateral color curve of the imaging lens assembly according to Embodiment 1, representing deviations of different image heights on an image plane after light passes through the imaging lens assembly. It can be seen from FIGS. 2A-2D that the imaging lens assembly according to Embodiment 1 can achieve a good image quality.

Embodiment 2

An imaging lens assembly according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural diagram illustrating the imaging lens assembly according to Embodiment 2 of the present disclosure.

As shown in FIG. 3, the imaging lens assembly includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface 510. Alternatively, the imaging lens assembly may further include an optical filter E6 having an object-side surface S11 and an image-side surface S12, and the optical filter E6 may be used to correct color deviations. In the imaging lens assembly of this embodiment, an aperture STO for limiting light beams may also be provided. Light from an object sequentially passes through the surfaces S1-S12 and finally forms an image on an image plane S13.

Table 4 shows the surface type, the radius of curvature, the thickness, the material and the conic coefficient of each lens of the imaging lens assembly in Embodiment 2. Table 5 shows the high-order coefficients of each aspheric mirror surface in Embodiment 2. Table 6 shows the effective focal lengths f1-f5 of the lenses, the total effective focal length f of the imaging lens assembly, the distance TTL from the object-side surface S1 of the first lens E1 to the image plane S13 of the imaging lens assembly on the optical axis, and the half of the maximal field-of-view HFOV of the imaging lens assembly in Embodiment 2. Here, the surface type of each aspheric surface may be defined by the formula (1) given in Embodiment 1.

TABLE 4

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.2028 | | | |
| S1 | aspheric | 1.8675 | 0.5705 | 1.546 | 56.11 | −2.7857 |
| S2 | aspheric | −21.1821 | 0.0672 | | | −41.9680 |
| S3 | aspheric | 4.0826 | 0.3000 | 1.666 | 20.37 | 12.9328 |
| S4 | aspheric | 1.8993 | 0.2951 | | | 0.7209 |
| S5 | aspheric | 13.5712 | 0.4821 | 1.546 | 56.11 | 38.3931 |
| S6 | aspheric | −13.8626 | 0.4112 | | | 85.7812 |
| S7 | aspheric | −7.5380 | 0.7216 | 1.536 | 55.77 | 21.8523 |
| S8 | aspheric | −0.8561 | 0.0500 | | | −4.5473 |
| S9 | aspheric | 16.4645 | 0.4200 | 1.546 | 56.11 | −99.0000 |
| S10 | aspheric | 0.7770 | 0.3618 | | | −5.9960 |
| S11 | spherical | infinite | 0.2069 | 1.517 | 64.17 | |
| S12 | spherical | infinite | 0.6137 | | | |
| S13 | spherical | infinite | | | | |

TABLE 5

| surface number | A4 | A6 | A8 | A10 | A12 | A14 | A16 | A18 | A20 |
|---|---|---|---|---|---|---|---|---|---|
| S1 | 5.3157E−03 | 1.7589E−01 | −1.0918E+00 | 3.6075E+00 | −7.7166E+00 | 1.0537E+01 | −8.9026E+00 | 4.2376E+00 | −8.6984E−01 |
| S2 | −1.1591E−01 | 3.8090E−01 | −9.8447E−01 | 1.7237E+00 | −2.2504E+00 | 2.1408E+00 | −1.4774E+00 | 7.0409E−01 | −1.7765E−01 |
| S3 | −1.5931E−01 | 5.6466E−01 | −1.3654E+00 | 2.5320E+00 | −3.1565E+00 | 1.7008E+00 | 1.1907E+00 | −2.2533E+00 | 9.2527E−01 |
| S4 | −8.7975E−02 | 3.8522E−02 | 1.6711E+00 | −1.0628E+01 | 3.6657E+01 | −7.7624E+01 | 1.0037E+02 | −7.2696E+01 | 2.2737E+01 |
| S5 | −1.5882E−01 | 5.1367E−01 | −4.2075E+00 | 2.0913E+01 | −6.6023E+01 | 1.3107E+02 | −1.5848E+02 | 1.0608E+02 | −2.9730E+01 |
| S6 | −6.9999E−02 | −3.0878E−01 | 1.5612E+00 | −5.6472E+00 | 1.2733E+01 | −1.8270E+01 | 1.6198E+01 | −8.1141E+00 | 1.7685E+00 |
| S7 | 5.2519E−02 | −2.6802E−01 | 7.6083E−01 | −1.8845E+00 | 2.9213E+00 | −2.7592E+00 | 1.5321E+00 | −4.5452E−01 | 5.5331E−02 |
| S8 | −1.0248E−03 | −2.9509E−01 | 6.9680E−01 | −9.7060E−01 | 8.4768E−01 | −4.4899E−01 | 1.4030E−01 | −2.3916E−02 | 1.7230E−03 |

TABLE 5-continued

| surface number | A4 | A6 | A8 | A10 | A12 | A14 | A16 | A18 | A20 |
|---|---|---|---|---|---|---|---|---|---|
| S9 | −2.4997E−01 | 8.1432E−02 | −1.6122E−02 | 3.5680E−02 | −2.9789E−02 | 1.1404E−02 | −2.3264E−03 | 2.4744E−04 | −1.0842E−05 |
| S10 | −1.3585E−01 | 7.2662E−02 | −3.0409E−02 | 9.7970E−03 | −2.6292E−03 | 5.5755E−04 | −8.2677E−05 | 7.3548E−06 | −2.8880E−07 |

TABLE 6

| f1(mm) | 3.17 | f(mm) | 3.45 |
|---|---|---|---|
| f2(mm) | −5.64 | TTL(mm) | 4.50 |
| f3(mm) | 12.64 | HFOV(°) | 41.3 |
| f4(mm) | 1.74 | | |
| f5(mm) | −1.51 | | |

Figure 4A:
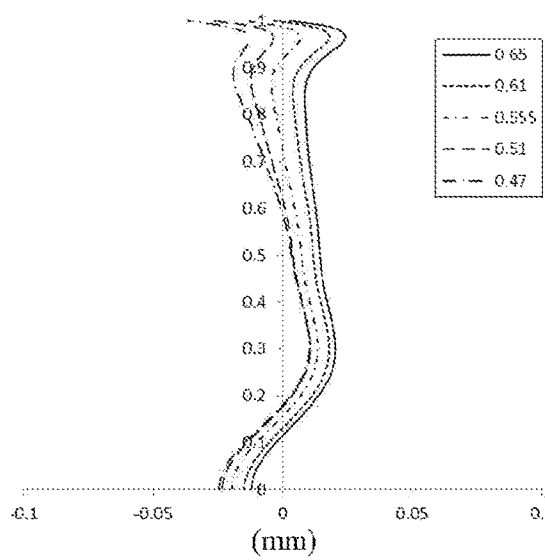
FIG. 4A illustrates a longitudinal aberration curve of the imaging lens assembly according to Embodiment 2.
Figure 4B:
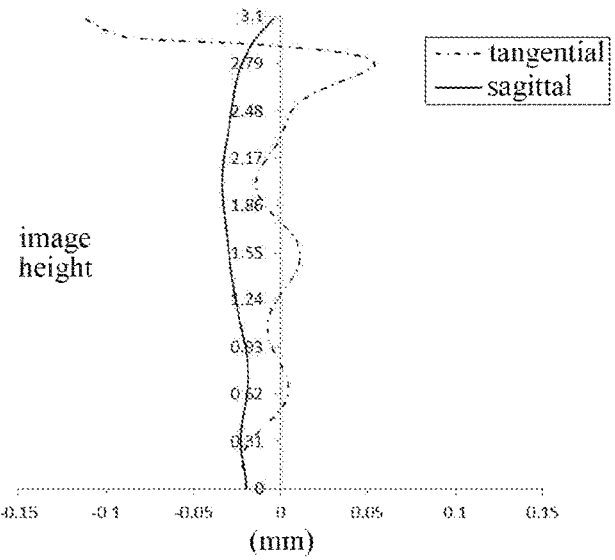
FIG. 4B illustrates an astigmatic curve of the imaging lens assembly according to Embodiment 2.
Figure 4C:
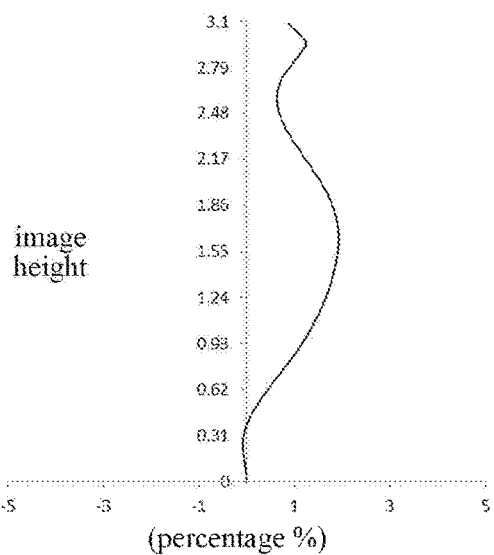
FIG. 4C illustrates a distortion curve of the imaging lens assembly according to Embodiment 2.
Figure 4D:
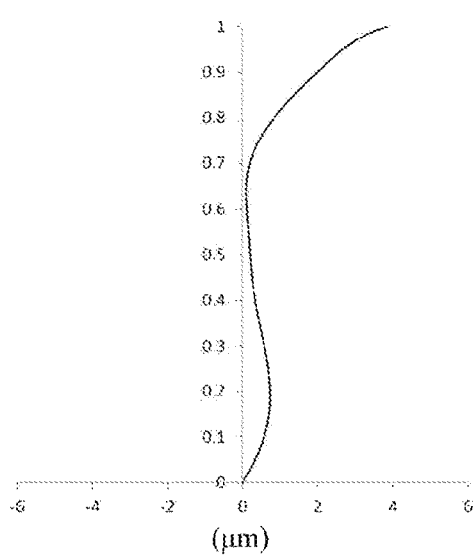
FIG. 4D illustrates a lateral color curve of the imaging lens assembly according to Embodiment 2.

FIG. 4A illustrates a longitudinal aberration curve of the imaging lens assembly according to Embodiment 2, representing deviations of focal points of light of different wavelengths converged after passing through an imaging lens assembly. FIG. 4B illustrates an astigmatic curve of the imaging lens assembly according to Embodiment 2, representing a curvature of a tangential image plane and a curvature of a sagittal image plane. FIG. 4C illustrates a distortion curve of the imaging lens assembly according to Embodiment 2, representing amounts of distortion at different viewing angles. FIG. 4D illustrates a lateral color curve of the imaging lens assembly according to Embodiment 2, representing deviations of different image heights on an image plane after light passes through the imaging lens assembly. It can be seen from FIGS. 4A-4D that the imaging lens assembly according to Embodiment 2 can achieve a good image quality.

Embodiment 3

An imaging lens assembly according to Embodiment 3 of the present disclosure is described below with reference to FIGS. 5-6D. FIG. 5 is a schematic structural diagram illustrating the imaging lens assembly according to Embodiment 3 of the present disclosure.

As shown in FIG. 5, the imaging lens assembly includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the imaging lens assembly may further include an optical filter E6 having an object-side surface S11 and an image-side surface S12, and the optical filter E6 may be used to correct color deviations. In the imaging lens assembly of this embodiment, an aperture STO for limiting light beams may also be provided. Light from an object sequentially passes through the surfaces S1-S12 and finally forms an image on an image plane S13.

Table 7 shows the surface type, the radius of curvature, the thickness, the material and the conic coefficient of each lens of the imaging lens assembly in Embodiment 3. Table 8 shows the high-order coefficients of each aspheric mirror surface in Embodiment 3. Table 9 shows the effective focal lengths f1-f5 of the lenses, the total effective focal length f of the imaging lens assembly, the distance TTL from the object-side surface S1 of the first lens E1 to the image plane S13 of the imaging lens assembly on the optical axis, and the half of the maximal field-of-view HFOV of the imaging lens assembly in Embodiment 3. Here, the surface type of each aspheric surface may be defined by the formula (1) given in Embodiment 1.

TABLE 7

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | 0.5870 | | | |
| S1 | aspheric | 1.8397 | 0.0500 | 1.546 | 56.11 | −2.6517 |
| S2 | aspheric | −16.5659 | 0.3000 | | | 87.3437 |
| S3 | aspheric | 5.8643 | 0.2372 | 1.666 | 20.37 | 1.6899 |
| S4 | aspheric | 2.1117 | 0.4801 | | | 0.7182 |
| S5 | aspheric | 9.1331 | 0.4426 | 1.546 | 56.11 | 65.5078 |
| S6 | aspheric | −13.8626 | 0.7522 | | | −90.2624 |
| S7 | aspheric | −5.9072 | 0.0500 | 1.536 | 55.77 | 0.3329 |
| S8 | aspheric | −0.7800 | 0.4489 | | | −4.4587 |
| S9 | aspheric | −14.7088 | 0.4063 | 1.546 | 56.11 | −99.0000 |
| S10 | aspheric | 0.7692 | 0.2069 | | | −6.1929 |
| S11 | spherical | infinite | 0.5387 | 1.517 | 64.17 | |
| S12 | spherical | infinite | 0.4209 | | | |
| S13 | spherical | infinite | | | | |

TABLE 8

| surface number | A4 | A6 | A8 | A10 | A12 | A14 | A16 | A18 | A20 |
|---|---|---|---|---|---|---|---|---|---|
| S1 | 1.3645E−02 | 1.5189E−01 | −1.1147E+00 | 4.1791E+00 | −9.9692E+00 | 1.4946E+01 | −1.3709E+01 | 7.0210E+00 | −1.5392E+00 |
| S2 | −1.5563E−01 | 6.6082E−01 | −1.5451E+00 | 1.5827E+00 | 8.9790E−01 | −5.1592E+00 | 6.8457E+00 | −4.1698E+00 | 9.8727E−01 |

TABLE 8-continued

| surface number | A4 | A6 | A8 | A10 | A12 | A14 | A16 | A18 | A20 |
|---|---|---|---|---|---|---|---|---|---|
| S3 | −2.1138E−01 | 1.0226E+00 | −2.9544E+00 | 7.2354E+00 | −1.5250E+01 | 2.5091E+01 | −2.8211E+01 | 1.8595E+01 | −5.3590E+00 |
| S4 | −1.1628E−01 | 1.0191E−01 | 1.8135E+00 | −1.1215E+01 | 3.5705E+01 | −6.9012E+01 | 8.1010E+01 | −5.2980E+01 | 1.4834E+01 |
| S5 | −1.8283E−01 | 5.7948E−01 | −4.8316E+00 | 2.4393E+01 | −7.6776E+01 | 1.5079E+02 | −1.7975E+02 | 1.1868E+02 | −3.2974E+01 |
| S6 | −6.4601E−02 | −3.7032E−01 | 1.7931E+00 | −6.1149E+00 | 1.3228E+01 | −1.8308E+01 | 1.5679E+01 | −7.5880E+00 | 1.6002E+00 |
| S7 | 1.7322E−02 | −8.0970E−02 | 6.4347E−02 | −3.4932E−01 | 7.5060E−01 | −7.9288E−01 | 4.3879E−01 | −1.1897E−01 | 1.2215E−02 |
| S8 | 3.4500E−04 | −2.3218E−01 | 4.3402E−01 | −5.3325E−01 | 4.4664E−01 | −2.2928E−01 | 6.8517E−02 | −1.0995E−02 | 7.3539E−04 |
| S9 | −5.6641E−02 | −2.8039E−01 | 3.8089E−01 | −2.3425E−01 | 8.6111E−02 | −2.0024E−02 | 2.8900E−03 | −2.3633E−04 | 8.3623E−06 |
| S10 | −1.0159E−01 | 3.0614E−02 | 9.1274E−04 | −5.1023E−03 | 2.1291E−03 | −4.5707E−04 | 5.5410E−05 | −3.5011E−06 | 8.6351E−08 |

TABLE 9

| f1(mm) | 3.07 | f(mm) | 3.45 |
|---|---|---|---|
| f2(mm) | −5.12 | TTL(mm) | 4.50 |
| f3(mm) | 10.16 | HFOV(°) | 43.0 |
| f4(mm) | 1.59 | | |
| f5(mm) | −1.33 | | |

Figures 6C, 6D:
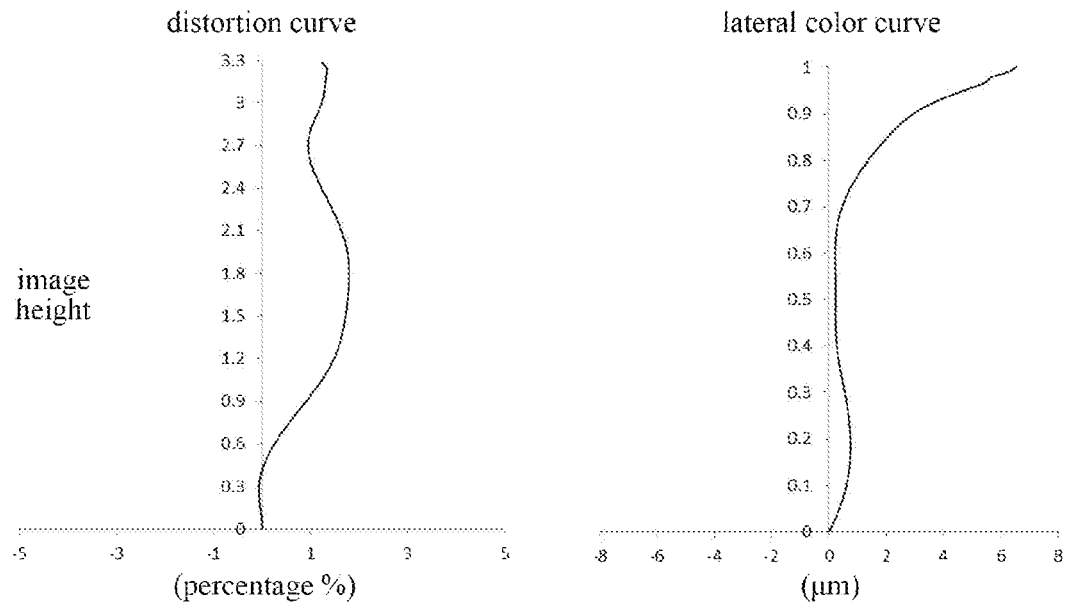
FIG. 6C illustrates a distortion curve of the imaging lens assembly according to Embodiment 3.
FIG. 6D illustrates a lateral color curve of the imaging lens assembly according to Embodiment 3.

FIG. 6A illustrates a longitudinal aberration curve of the imaging lens assembly according to Embodiment 3, representing deviations of focal points of light of different wavelengths converged after passing through an imaging lens assembly. FIG. 6B illustrates an astigmatic curve of the imaging lens assembly according to Embodiment 3, representing a curvature of a tangential image plane and a curvature of a sagittal image plane. FIG. 6C illustrates a distortion curve of the imaging lens assembly according to Embodiment 3, representing amounts of distortion at different viewing angles. FIG. 6D illustrates a lateral color curve of the imaging lens assembly according to Embodiment 3, representing deviations of different image heights on an image plane after light passes through the imaging lens assembly. It can be seen from FIGS. 6A-6D that the imaging lens assembly according to Embodiment 3 can achieve a good image quality.

Embodiment 4

Figure 7:
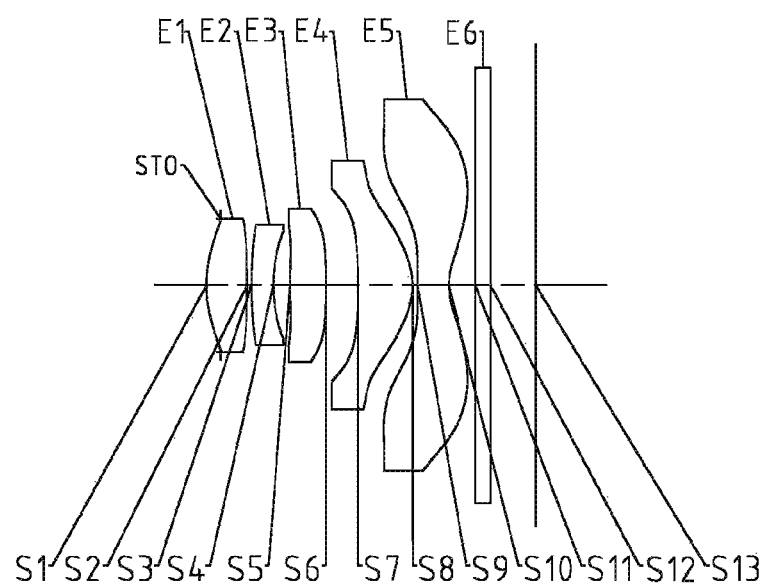
FIG. 7 is a schematic structural diagram illustrating an imaging lens assembly according to Embodiment 4 of the present disclosure.

An imaging lens assembly according to Embodiment 4 of the present disclosure is described below with reference to FIGS. 7-8D. FIG. 7 is a schematic structural diagram illustrating the imaging lens assembly according to Embodiment 4 of the present disclosure.

As shown in FIG. 7, the imaging lens assembly includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the imaging lens assembly may further include an optical filter E6 having an object-side surface S11 and an image-side surface S12, and the optical filter E6 may be used to correct color deviations. In the imaging lens assembly of this embodiment, an aperture STO for limiting light beams may also be provided. Light from an object sequentially passes through the surfaces S1-S12 and finally forms an image on an image plane S13.

Table 10 shows the surface type, the radius of curvature, the thickness, the material and the conic coefficient of each lens of the imaging lens assembly in Embodiment 4. Table 11 shows the high-order coefficients of each aspheric mirror surface in Embodiment 4. Table 12 shows the effective focal lengths f1-f5 of the lenses, the total effective focal length f of the imaging lens assembly, the distance TTL from the object-side surface S1 of the first lens E1 to the image plane S13 of the imaging lens assembly on the optical axis, and the half of the maximal field-of-view HFOV of the imaging lens assembly in Embodiment 4. Here, the surface type of each aspheric surface may be defined by the formula (1) given in Embodiment 1.

TABLE 10

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.1919 | | | |
| S1 | aspheric | 1.8470 | 0.5538 | 1.546 | 56.11 | −2.5232 |
| S2 | aspheric | −17.3737 | 0.0595 | | | −91.8526 |
| S3 | aspheric | 5.2118 | 0.3000 | 1.666 | 20.37 | 14.1744 |
| S4 | aspheric | 1.9671 | 0.2300 | | | 0.3983 |
| S5 | aspheric | 8.8856 | 0.4862 | 1.546 | 56.11 | 71.0717 |
| S6 | aspheric | −13.8626 | 0.4436 | | | −38.0294 |
| S7 | aspheric | −6.6872 | 0.7458 | 1.536 | 55.77 | 19.8172 |
| S8 | aspheric | −0.8501 | 0.0656 | | | −4.2385 |
| S9 | aspheric | 37.5502 | 0.4287 | 1.546 | 56.11 | 0.2430 |
| S10 | aspheric | 0.7885 | 0.3615 | | | −5.7118 |
| S11 | spherical | infinite | 0.2069 | 1.517 | 64.17 | |
| S12 | spherical | infinite | 0.6183 | | | |
| S13 | spherical | infinite | | | | |

TABLE 11

| surface number | A4 | A6 | A8 | A10 | A12 | A14 | A16 | A18 | A20 |
|---|---|---|---|---|---|---|---|---|---|
| S1 | 1.8132E−02 | 1.0992E−01 | −1.0132E+00 | 4.6105E+00 | −1.3227E+01 | 2.3580E+01 | −2.5438E+01 | 1.5171E+01 | −3.8398E+00 |
| S2 | −1.2478E−01 | 5.3947E−01 | −1.7617E+00 | 4.1986E+00 | −7.9325E+00 | 1.0942E+01 | −1.0162E+01 | 5.6487E+00 | −1.4309E+00 |
| S3 | −1.9134E−01 | 9.4801E−01 | −3.7384E+00 | 1.3190E+01 | −3.5977E+01 | 6.7414E+01 | −8.0130E+01 | 5.4093E+01 | −1.5796E+01 |
| S4 | −1.1154E−01 | 1.4071E−02 | 2.5927E+00 | −1.6461E+01 | 5.7373E+01 | −1.2287E+02 | 1.6009E+02 | −1.1614E+02 | 3.5921E+01 |
| S5 | −1.8622E−01 | 6.4698E−01 | −5.2025E+00 | 2.6190E+01 | −8.3569E+01 | 1.6794E+02 | −2.0627E+02 | 1.4149E+02 | −4.1295E+01 |
| S6 | −6.5142E−02 | −3.7212E−01 | 1.9241E+00 | −6.6165E+00 | 1.4120E+01 | −1.9091E+01 | 1.5891E+01 | −7.4510E+00 | 1.5194E+00 |
| S7 | 3.6491E−02 | −2.2661E−01 | 6.6898E−01 | −1.6639E+00 | 2.5837E+00 | −2.4506E+00 | 1.3744E+00 | −4.1738E−01 | 5.2981E−02 |
| S8 | −3.1296E−02 | −1.9212E−01 | 4.7404E−01 | −6.5699E−01 | 5.7169E−01 | −2.9666E−01 | 8.8909E−02 | −1.4256E−02 | 9.4986E−04 |
| S9 | −2.6954E−01 | 1.2368E−01 | −4.5965E−02 | 3.9000E−02 | −2.3437E−02 | 7.6714E−03 | −1.4054E−03 | 1.3744E−04 | −5.6292E−06 |
| S10 | −1.6725E−01 | 1.2691E−01 | −7.7664E−02 | 3.4188E−02 | −1.0464E−02 | 2.1396E−03 | −2.7740E−04 | 2.0615E−05 | −6.6835E−07 |

TABLE 12

| f1(mm) | 3.09 | f(mm) | 3.45 |
|---|---|---|---|
| f2(mm) | −4.92 | TTL(mm) | 4.50 |
| f3(mm) | 9.99 | HFOV(°) | 43.0 |
| f4(mm) | 1.74 | | |
| f5(mm) | −1.48 | | |

FIG. 8A illustrates a longitudinal aberration curve of the imaging lens assembly according to Embodiment 4, representing deviations of focal points of light of different wavelengths converged after passing through an imaging lens assembly. FIG. 8B illustrates an astigmatic curve of the imaging lens assembly according to Embodiment 4, representing a curvature of a tangential image plane and a curvature of a sagittal image plane. FIG. 8C illustrates a distortion curve of the imaging lens assembly according to Embodiment 4, representing amounts of distortion at different viewing angles. FIG. 8D illustrates a lateral color curve of the imaging lens assembly according to Embodiment 4, representing deviations of different image heights on an image plane after light passes through the imaging lens assembly. It can be seen from FIGS. 8A-8D that the imaging lens assembly according to Embodiment 4 can achieve a good image quality.

Embodiment 5

Figure 9:
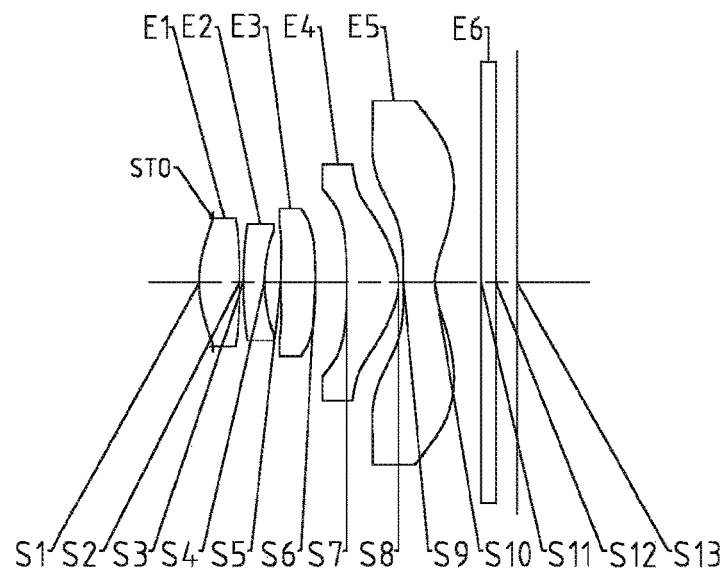
FIG. 9 is a schematic structural diagram illustrating an imaging lens assembly according to Embodiment 5 of the present disclosure.

An imaging lens assembly according to Embodiment 5 of the present disclosure is described below with reference to FIGS. 9-10D. FIG. 9 is a schematic structural diagram illustrating the imaging lens assembly according to Embodiment 5 of the present disclosure.

As shown in FIG. 9, the imaging lens assembly includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the imaging lens assembly may further include an optical filter E6 having an object-side surface S11 and an image-side surface S12, and the optical filter E6 may be used to correct color deviations. In the imaging lens assembly of this embodiment, an aperture STO for limiting light beams may also be provided. Light from an object sequentially passes through the surfaces S1-S12 and finally forms an image on an image plane S13.

Table 13 shows the surface type, the radius of curvature, the thickness, the material and the conic coefficient of each lens of the imaging lens assembly in Embodiment 5. Table 14 shows the high-order coefficients of each aspheric mirror surface in Embodiment 5. Table 15 shows the effective focal lengths f1-f5 of the lenses, the total effective focal length f of the imaging lens assembly, the distance TTL from the object-side surface S1 of the first lens E1 to the image plane S13 of the imaging lens assembly on the optical axis, and the half of the maximal field-of-view HFOV of the imaging lens assembly in Embodiment 5. Here, the surface type of each aspheric surface may be defined by the formula (1) given in Embodiment 1.

TABLE 13

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.1911 | | | |
| S1 | aspheric | 1.8511 | 0.5694 | 1.546 | 56.11 | −2.5395 |
| S2 | aspheric | −16.1318 | 0.0536 | | | −49.0069 |
| S3 | aspheric | 5.6131 | 0.3000 | 1.666 | 20.37 | 17.6127 |
| S4 | aspheric | 2.0151 | 0.2309 | | | 0.5415 |
| S5 | aspheric | 8.8643 | 0.4873 | 1.546 | 56.11 | 70.7990 |
| S6 | aspheric | −13.8626 | 0.4502 | | | −39.7518 |
| S7 | aspheric | −6.7646 | 0.7403 | 1.536 | 55.77 | 14.1585 |
| S8 | aspheric | −0.8559 | 0.0647 | | | −4.4138 |
| S9 | aspheric | 23.3588 | 0.4428 | 1.546 | 56.11 | −32.5104 |
| S10 | aspheric | 0.7688 | 0.6599 | | | −5.7084 |
| S11 | spherical | infinite | 0.2069 | 1.517 | 64.17 | |
| S12 | spherical | infinite | 0.2941 | | | |
| S13 | spherical | infinite | | | | |

TABLE 14

| surface number | A4 | A6 | A8 | A10 | A12 | A14 | A16 | A18 | A20 |
|---|---|---|---|---|---|---|---|---|---|
| S1 | 1.6473E−02 | 1.2850E−01 | −1.1214E+00 | 4.9872E+00 | −1.4036E+01 | 2.4637E+01 | −2.6239E+01 | 1.5481E+01 | −3.8825E+00 |
| S2 | −1.3930E−01 | 6.1923E−01 | −1.9367E+00 | 4.0248E+00 | −5.9817E+00 | 5.8633E+00 | −3.4409E+00 | 1.0636E+00 | −1.5447E−01 |
| S3 | −2.0231E−01 | 1.0066E+00 | −3.7282E+00 | 1.2050E+01 | −3.1061E+01 | 5.6797E+01 | −6.7212E+01 | 4.5704E+01 | −1.3535E+01 |
| S4 | −1.1226E−01 | 3.5972E−02 | 2.4902E+00 | −1.5948E+01 | 5.5115E+01 | −1.1665E+02 | 1.5020E+02 | −1.0783E+02 | 3.3062E+01 |
| S5 | −1.7567E−01 | 5.1448E−01 | −4.0675E+00 | 2.0382E+01 | −6.4753E+01 | 1.2930E+02 | −1.5758E+02 | 1.0712E+02 | −3.0930E+01 |
| S6 | −7.3347E−02 | −2.7507E−01 | 1.3827E+00 | −4.8018E+00 | 1.0373E+01 | −1.4218E+01 | 1.1990E+01 | −5.6882E+00 | 1.1727E+00 |
| S7 | 4.5552E−02 | −2.4408E−01 | 6.2416E−01 | −1.3858E+00 | 1.9999E+00 | −1.7946E+00 | 9.6016E−01 | −2.7938E−01 | 3.4109E−02 |
| S8 | −2.8461E−02 | −2.1072E−01 | 5.3210E−01 | −7.4258E−01 | 6.4500E−01 | −3.3634E−01 | 1.0226E−01 | −1.6784E−02 | 1.1540E−03 |
| S9 | −2.6490E−01 | 1.2756E−01 | −5.0523E−02 | 3.8172E−02 | −2.1257E−02 | 6.6639E−03 | −1.1824E−03 | 1.1250E−04 | −4.4945E−06 |
| S10 | −1.4640E−01 | 1.0368E−01 | −5.9086E−02 | 2.4450E−02 | −7.1084E−03 | 1.3904E−03 | −1.7334E−04 | 1.2450E−05 | −3.9195E−07 |

TABLE 15

| f1(mm) | 3.08 | f(mm) | 3.45 |
|---|---|---|---|
| f2(mm) | −4.88 | TTL(mm) | 4.50 |
| f3(mm) | 9.98 | HFOV(°) | 43.1 |
| f4(mm) | 1.75 | | |
| f5(mm) | −1.47 | | |

Figures 10A, 10B:
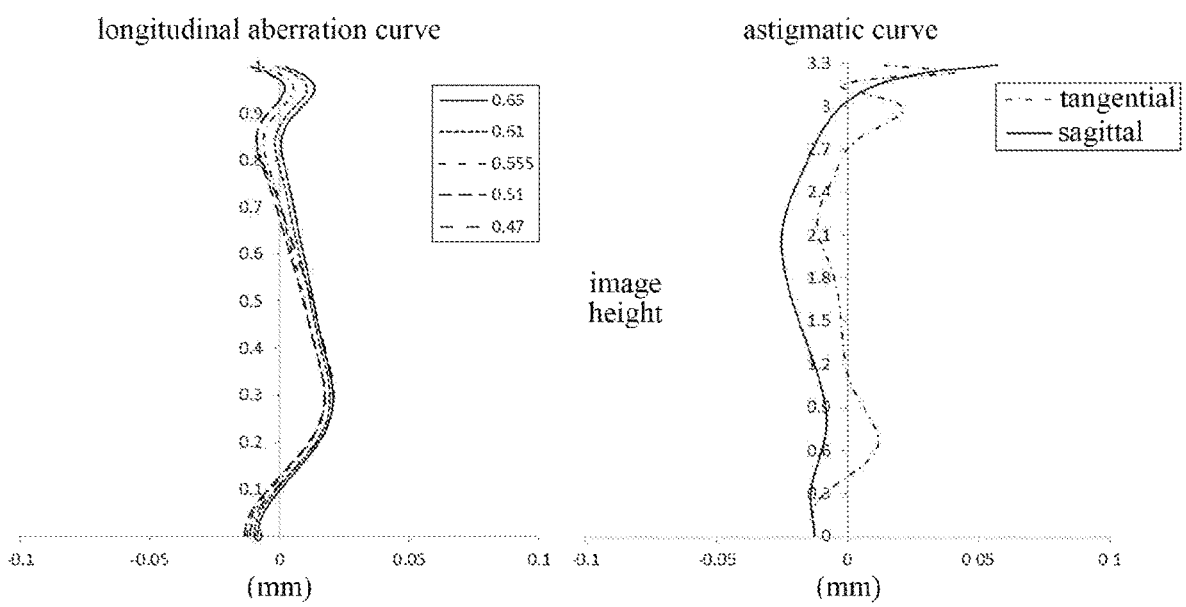
FIG. 10A illustrates a longitudinal aberration curve of the imaging lens assembly according to Embodiment 5.
FIG. 10B illustrates an astigmatic curve of the imaging lens assembly according to Embodiment 5.
Figures 10C, 10D:
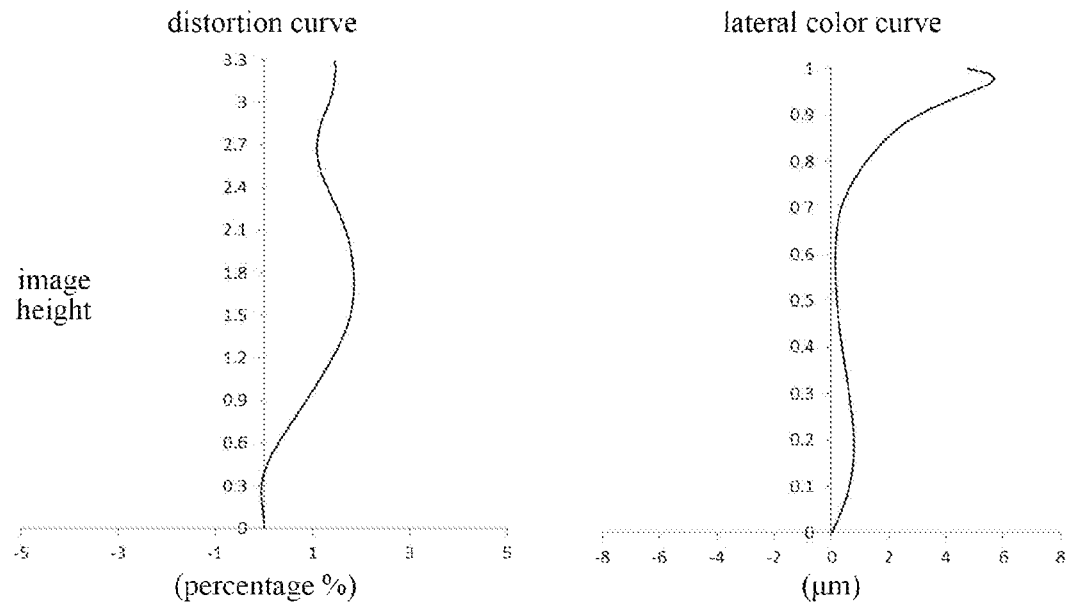
FIG. 10C illustrates a distortion curve of the imaging lens assembly according to Embodiment 5.
FIG. 10D illustrates a lateral color curve of the imaging lens assembly according to Embodiment 5.

FIG. 10A illustrates a longitudinal aberration curve of the imaging lens assembly according to Embodiment 5, representing deviations of focal points of light of different wavelengths converged after passing through an imaging lens assembly. FIG. 10B illustrates an astigmatic curve of the imaging lens assembly according to Embodiment 5, representing a curvature of a tangential image plane and a curvature of a sagittal image plane. FIG. 10C illustrates a distortion curve of the imaging lens assembly according to Embodiment 5, representing amounts of distortion at different viewing angles. FIG. 10D illustrates a lateral color curve of the imaging lens assembly according to Embodiment 5, representing deviations of different image heights on an image plane after light passes through the imaging lens assembly. It can be seen from FIGS. 10A-10D that the imaging lens assembly according to Embodiment 5 can achieve a good image quality.

Embodiment 6

Figure 11:
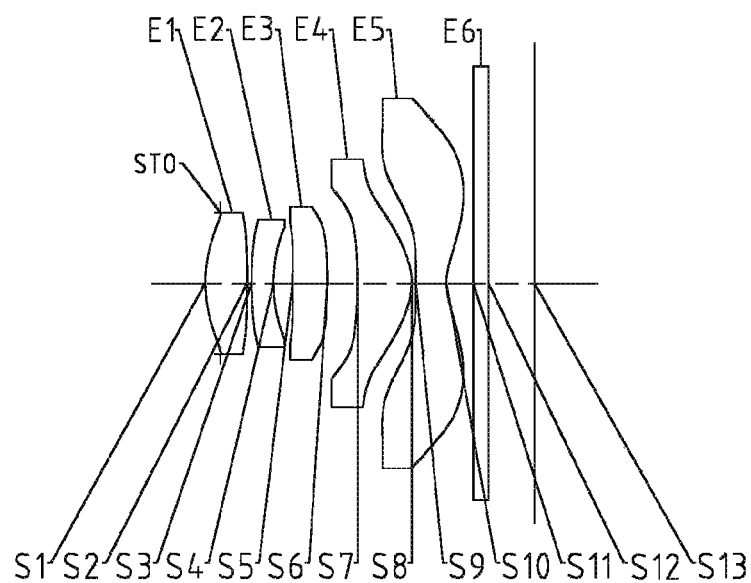
FIG. 11 is a schematic structural diagram illustrating an imaging lens assembly according to Embodiment 6 of the present disclosure.

An imaging lens assembly according to Embodiment 6 of the present disclosure is described below with reference to FIGS. 11-12D. FIG. 11 is a schematic structural diagram illustrating the imaging lens assembly according to Embodiment 6 of the present disclosure.

As shown in FIG. 11, the imaging lens assembly includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Alternatively, the imaging lens assembly may further include an optical filter E6 having an object-side surface S11 and an image-side surface S12, and the optical filter E6 may be used to correct color deviations. In the imaging lens assembly of this embodiment, an aperture STO for limiting light beams may also be provided. Light from an object sequentially passes through the surfaces S1-S12 and finally forms an image on an image plane S13.

Table 16 shows the surface type, the radius of curvature, the thickness, the material and the conic coefficient of each lens of the imaging lens assembly in Embodiment 6. Table 17 shows the high-order coefficients of each aspheric mirror surface in Embodiment 6. Table 18 shows the effective focal lengths f1-f5 of the lenses, the total effective focal length f of the imaging lens assembly, the distance TTL from the object-side surface S1 of the first lens E1 to the image plane S13 of the imaging lens assembly on the optical axis, and the half of the maximal field-of-view HFOV of the imaging lens assembly in Embodiment 6. Here, the surface type of each aspheric surface may be defined by the formula (1) given in Embodiment 1.

TABLE 16

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.2086 | | | |
| S1 | aspheric | 1.8628 | 0.5741 | 1.546 | 56.11 | −2.6382 |
| S2 | aspheric | −19.9566 | 0.0585 | | | −99.0000 |
| S3 | aspheric | 4.5164 | 0.3000 | 1.666 | 20.37 | 14.9231 |
| S4 | aspheric | 1.9787 | 0.2594 | | | 0.5539 |
| S5 | aspheric | 12.0381 | 0.4766 | 1.546 | 56.11 | 60.9123 |
| S6 | aspheric | −13.8626 | 0.4140 | | | 13.6154 |
| S7 | aspheric | −6.6636 | 0.7409 | 1.536 | 55.77 | 20.8412 |
| S8 | aspheric | −0.8466 | 0.0556 | | | −4.3042 |
| S9 | aspheric | 40.4575 | 0.4162 | 1.546 | 56.11 | 40.6073 |
| S10 | aspheric | 0.8062 | 0.3680 | | | −6.2152 |
| S11 | spherical | infinite | 0.2069 | 1.517 | 64.17 | |
| S12 | spherical | infinite | 0.6298 | | | |
| S13 | spherical | infinite | | | | |

TABLE 17

| surface number | A4 | A6 | A8 | A10 | A12 | A14 | A16 | A18 | A20 |
|---|---|---|---|---|---|---|---|---|---|
| S1 | 9.6667E−03 | 1.3399E−01 | −8.5878E−01 | 2.8695E+00 | −6.2784E+00 | 8.8198E+00 | −7.6908E+00 | 3.7836E+00 | −8.0336E−01 |
| S2 | −1.3662E−01 | 5.8345E−01 | −2.0169E+00 | 5.5202E+00 | −1.1732E+01 | 1.7529E+01 | −1.6908E+01 | 9.3565E+00 | −2.2490E+00 |
| S3 | −1.8075E−01 | 7.1579E−01 | −1.8929E+00 | 4.1002E+00 | −6.8237E+00 | 7.9187E+00 | −5.8341E+00 | 2.3999E+00 | −4.3491E−01 |
| S4 | −1.0725E−01 | 1.1699E−01 | 1.4671E+00 | −1.0733E+01 | 3.9860E+01 | −8.8699E+01 | 1.1825E+02 | −8.6871E+01 | 2.7110E+01 |
| S5 | −1.7062E−01 | 5.5670E−01 | −4.6234E+00 | 2.3261E+01 | −7.3378E+01 | 1.4426E+02 | −1.7154E+02 | 1.1249E+02 | −3.0814E+01 |
| S6 | −6.2493E−02 | −3.8409E−01 | 1.9659E+00 | −6.9365E+00 | 1.5245E+01 | −2.1217E+01 | 1.8171E+01 | −8.7660E+00 | 1.8382E+00 |
| S7 | 2.5082E−02 | −1.0480E−01 | 1.1202E−01 | −3.2463E−01 | 6.4798E−01 | −7.3110E−01 | 4.5408E−01 | −1.4385E−01 | 1.8304E−02 |
| S8 | −7.6371E−03 | −2.9718E−01 | 7.0580E−01 | −9.6542E−01 | 8.2561E−01 | −4.2635E−01 | 1.2889E−01 | −2.1065E−02 | 1.4416E−03 |
| S9 | −2.4703E−01 | 6.3315E−02 | 2.9144E−02 | −1.6040E−02 | 1.4998E−03 | 6.5379E−04 | −2.1227E−04 | 2.5171E−05 | −1.1372E−06 |
| S10 | −1.4454E−01 | 7.7720E−02 | −3.0232E−02 | 7.5369E−03 | −1.1630E−03 | 8.9277E−05 | −6.4083E−07 | −1.1763E−07 | −1.3264E−08 |

TABLE 18

| | | | |
|---|---|---|---|
| f1(mm) | 3.15 | f(mm) | 3.45 |
| f2(mm) | −5.55 | TTL(mm) | 4.50 |
| f3(mm) | 11.88 | HFOV(°) | 43.1 |
| f4(mm) | 1.73 | | |
| f5(mm) | −1.51 | | |

Figure 12A:
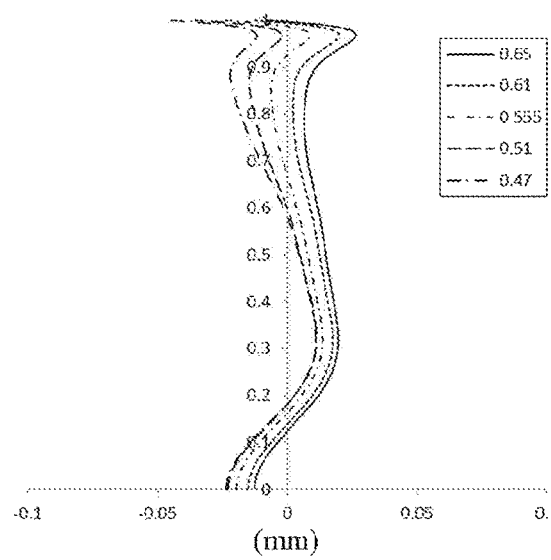
FIG. 12A illustrates a longitudinal aberration curve of the imaging lens assembly according to Embodiment 6.
Figure 12B:
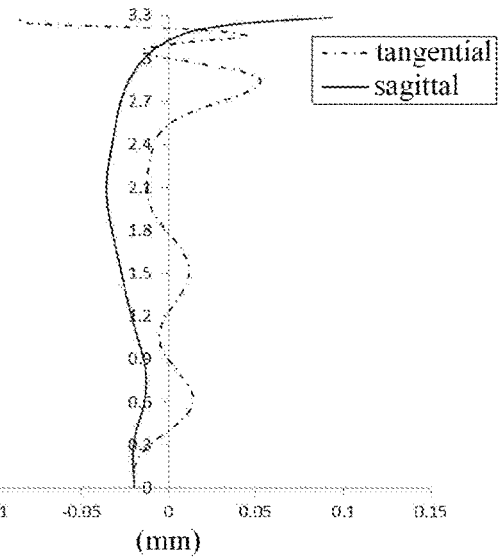
FIG. 12B illustrates an astigmatic curve of the imaging lens assembly according to Embodiment 6.
Figure 12C:
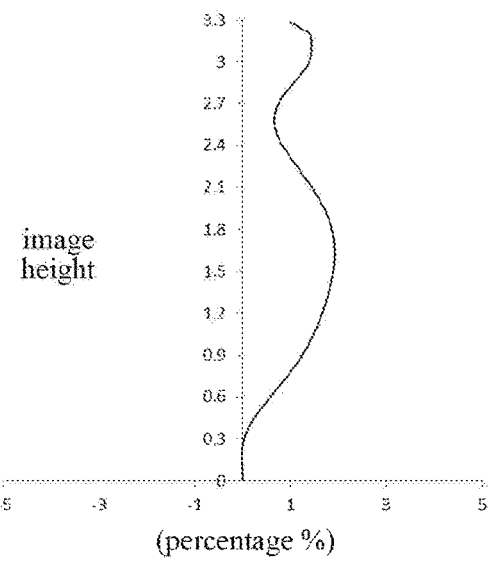
FIG. 12C illustrates a distortion curve of the imaging lens assembly according to Embodiment 6.
Figure 12D:
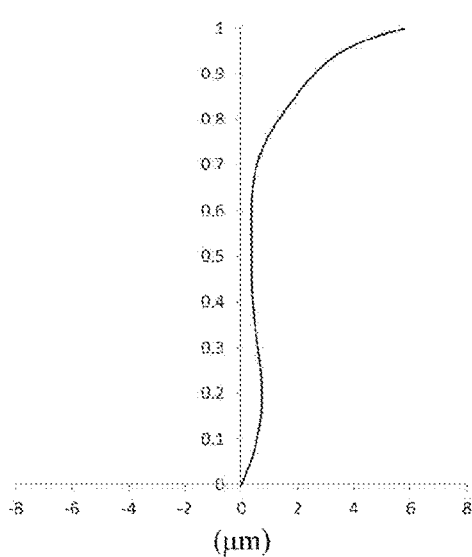
FIG. 12D illustrates a lateral color curve of the imaging lens assembly according to Embodiment 6.

FIG. 12A illustrates a longitudinal aberration curve of the imaging lens assembly according to Embodiment 6, representing deviations of focal points of light of different wavelengths converged after passing through an imaging lens assembly. FIG. 12B illustrates an astigmatic curve of the imaging lens assembly according to Embodiment 6, representing a curvature of a tangential image plane and a curvature of a sagittal image plane. FIG. 12C illustrates a distortion curve of the imaging lens assembly according to Embodiment 6, representing amounts of distortion at different viewing angles. FIG. 12D illustrates a lateral color curve of the imaging lens assembly according to Embodiment 6, representing deviations of different image heights on an image plane after light passes through the imaging lens assembly. It can be seen from FIGS. 12A-12D that the imaging lens assembly according to Embodiment 6 can achieve a good image quality.

Embodiment 7

An imaging lens assembly according to Embodiment 7 of the present disclosure is described below with reference to FIGS. 13-14D. FIG. 13 is a schematic structural diagram illustrating the imaging lens assembly according to Embodiment 7 of the present disclosure.

As shown in FIG. 13, the imaging lens assembly includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface 510. Alternatively, the imaging lens assembly may further include an optical filter E6 having an object-side surface S11 and an image-side surface 512, and the optical filter E6 may be used to correct color deviations. In the imaging lens assembly of this embodiment, an aperture STO for limiting light beams may also be provided. Light from an object sequentially passes through the surfaces S1-S12 and finally forms an image on an image plane S13.

Table 19 shows the surface type, the radius of curvature, the thickness, the material and the conic coefficient of each lens of the imaging lens assembly in Embodiment 7. Table 20 shows the high-order coefficients of each aspheric mirror surface in Embodiment 7. Table 21 shows the effective focal lengths f1-f5 of the lenses, the total effective focal length f of the imaging lens assembly, the distance TTL from the object-side surface S1 of the first lens E1 to the image plane S13 of the imaging lens assembly on the optical axis, and the half of the maximal field-of-view HFOV of the imaging lens assembly in Embodiment 7. Here, the surface type of each aspheric surface may be defined by the formula (1) given in Embodiment 1.

TABLE 19

| surface number | surface type | radius of curvature | thickness | material | | conic coefficient |
|---|---|---|---|---|---|---|
| | | | | refractive index | abbe number | |
| OBJ | spherical | infinite | infinite | | | |
| STO | spherical | infinite | −0.2077 | | | |
| S1 | aspheric | 1.8257 | 0.5887 | 1.546 | 56.11 | −2.5738 |
| S2 | aspheric | −18.4762 | 0.0500 | | | −12.6647 |
| S3 | aspheric | 5.7794 | 0.3000 | 1.666 | 20.37 | 7.4240 |
| S4 | aspheric | 2.1143 | 0.2360 | | | 0.8124 |
| S5 | aspheric | 9.5674 | 0.4789 | 1.546 | 56.11 | 45.3030 |
| S6 | aspheric | −13.8626 | 0.4375 | | | 23.8480 |
| S7 | aspheric | −5.9026 | 0.7576 | 1.536 | 55.77 | 2.0853 |
| S8 | aspheric | −0.7927 | 0.0500 | | | −4.6696 |
| S9 | aspheric | −31.1552 | 0.4463 | 1.546 | 56.11 | −99.0000 |
| S10 | aspheric | 0.7611 | 0.4078 | | | −6.1060 |
| S11 | spherical | infinite | 0.2069 | 1.517 | 64.17 | |
| S12 | spherical | infinite | 0.5403 | | | |
| S13 | spherical | infinite | | | | |

TABLE 20

| surface number | A4 | A6 | A8 | A10 | A12 | A14 | A16 | A18 | A20 |
|---|---|---|---|---|---|---|---|---|---|
| S1 | 1.4649E−02 | 1.3905E−01 | −1.0213E+00 | 3.7665E+00 | −8.8317E+00 | 1.2986E+01 | −1.1672E+01 | 5.8520E+00 | −1.2557E+00 |
| S2 | −1.7956E−01 | 6.9228E−01 | −1.5871E+00 | 1.4385E+00 | 1.7841E+00 | −7.2685E+00 | 9.5438E+00 | −5.9893E+00 | 1.4954E+00 |
| S3 | −2.2066E−01 | 9.9517E−01 | −2.4971E+00 | 4.5227E+00 | −6.0697E+00 | 6.2107E+00 | −4.9557E+00 | 2.8363E+00 | −8.4416E−01 |
| S4 | −1.1822E−01 | 1.2918E−01 | 1.6353E+00 | −1.0426E+01 | 3.3582E+01 | −6.5679E+01 | 7.8313E+01 | −5.2300E+01 | 1.5055E+01 |
| S5 | −1.7928E−01 | 5.2986E−01 | −4.1656E+00 | 2.0310E+01 | −6.2309E+01 | 1.1970E+02 | −1.3965E+02 | 9.0060E+01 | −2.4240E+01 |
| S6 | −5.8797E−02 | −3.9627E−01 | 1.9337E+00 | −6.4991E+00 | 1.3865E+01 | −1.9003E+01 | 1.6175E+01 | −7.8009E+00 | 1.6412E+00 |
| S7 | 3.1534E−02 | −2.3997E−01 | 5.8914E−01 | −1.3093E+00 | 1.8673E+00 | −1.6333E+00 | 8.3388E−01 | −2.2442E−01 | 2.4429E−02 |
| S8 | −1.0558E−01 | −7.8972E−03 | 1.6339E−01 | −3.0570E−01 | 3.1128E−01 | −1.7471E−01 | 5.4533E−02 | −8.9533E−03 | 6.0645E−04 |
| S9 | −2.0265E−01 | 2.0660E−02 | 8.1322E−02 | −5.8258E−02 | 2.0820E−02 | −4.5162E−03 | 5.9835E−04 | −4.4184E−05 | 1.3725E−06 |
| S10 | −1.3229E−01 | 7.9384E−02 | −3.6331E−02 | 1.1895E−02 | −2.8094E−03 | 4.6218E−04 | −5.0392E−05 | 3.3374E−06 | −1.0313E−07 |

TABLE 21

| f1(mm) | 3.07 | f(mm) | 3.45 |
|---|---|---|---|
| f2(mm) | −5.17 | TTL(mm) | 4.50 |
| f3(mm) | 10.44 | HFOV(°) | 43.0 |
| f4(mm) | 1.62 | | |
| f5(mm) | −1.35 | | |

FIG. 14A illustrates a longitudinal aberration curve of the imaging lens assembly according to Embodiment 7, representing deviations of focal points of light of different wavelengths converged after passing through an imaging lens assembly. FIG. 14B illustrates an astigmatic curve of the imaging lens assembly according to Embodiment 7, representing a curvature of a tangential image plane and a curvature of a sagittal image plane. FIG. 14C illustrates a distortion curve of the imaging lens assembly according to Embodiment 7, representing amounts of distortion at different viewing angles. FIG. 14D illustrates a lateral color curve of the imaging lens assembly according to Embodiment 7, representing deviations of different image heights on an image plane after light passes through the imaging lens assembly. It can be seen from FIGS. 14A-14D that the imaging lens assembly according to Embodiment 7 can achieve a good image quality.

Embodiment 8

An imaging lens assembly according to Embodiment 8 of the present disclosure is described below with reference to FIGS. 15-16D. FIG. 15 is a schematic structural diagram illustrating the imaging lens assembly according to Embodiment 8 of the present disclosure.

As shown in FIG. 15, the imaging lens assembly includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface 510. Alternatively, the imaging lens assembly may further include an optical filter E6 having an object-side surface S11 and an image-side surface S12, and the optical filter E6 may be used to correct color deviations. In the imaging lens assembly of this embodiment, an aperture STO for limiting light beams may also be provided. Light from an object sequentially passes through the surfaces S1-S12 and finally forms an image on an image plane S13.

Table 22 shows the surface type, the radius of curvature, the thickness, the material and the conic coefficient of each lens of the imaging lens assembly in Embodiment 8. Table 23 shows the high-order coefficients of each aspheric mirror surface in Embodiment 8. Table 24 shows the effective focal lengths f1-f5 of the lenses, the total effective focal length f of the imaging lens assembly, the distance TTL from the object-side surface S1 of the first lens E1 to the image plane S13 of the imaging lens assembly on the optical axis, and the half of the maximal field-of-view HFOV of the imaging lens assembly in Embodiment 8. Here, the surface type of each aspheric surface may be defined by the formula (1) given in Embodiment 1.

TABLE 22

| surface number | surface type | radius of curvature | thickness | material | | conic coefficient |
|---|---|---|---|---|---|---|
| | | | | refractive index | abbe number | |
| OBJ | spherical | infinite | infinite | | | |
| STO | spherical | infinite | −0.1900 | | | |
| S1 | aspheric | 1.8335 | 0.5689 | 1.546 | 56.11 | −2.7111 |
| S2 | aspheric | −15.9016 | 0.0500 | | | 99.0000 |
| S3 | aspheric | 6.0008 | 0.3000 | 1.666 | 20.37 | 0.2763 |
| S4 | aspheric | 2.0564 | 0.2171 | | | 0.6900 |
| S5 | aspheric | 8.2841 | 0.4817 | 1.546 | 56.11 | 66.4604 |
| S6 | aspheric | −13.8626 | 0.4635 | | | −95.7956 |
| S7 | aspheric | −6.0490 | 0.7587 | 1.536 | 55.77 | 4.554 |
| S8 | aspheric | −0.7845 | 0.0500 | | | −4.5100 |
| S9 | aspheric | −19.5565 | 0.4487 | 1.546 | 56.11 | −99.0000 |
| S10 | aspheric | 0.7629 | 0.4111 | | | −6.0663 |
| S11 | spherical | infinite | 0.2069 | 1.517 | 64.17 | |
| 512 | spherical | infinite | 0.5435 | | | |
| S13 | spherical | infinite | | | | |

TABLE 23

| surface number | A4 | A6 | A8 | A10 | A12 | A14 | A16 | A18 | A20 |
|---|---|---|---|---|---|---|---|---|---|
| S1 | 1.7356E−02 | 1.5019E−01 | −1.3324E+00 | 6.0066E+00 | −1.7082E+01 | 3.0276E+01 | −3.2543E+01 | 1.9378E+01 | −4.9038E+00 |
| S2 | −1.6475E−01 | 7.6648E−01 | −2.4256E+00 | 5.2596E+00 | −8.4524E+00 | 9.6503E+00 | −7.4911E+00 | 3.6815E+00 | −9.1213E−01 |
| S3 | −2.1980E−01 | 1.2602E+00 | −5.0049E+00 | 1.7334E+01 | −4.6785E+01 | 8.8152E+01 | −1.0648E+02 | 7.3506E+01 | −2.2013E+01 |
| S4 | −1.1138E−01 | −6.7356E−02 | 3.8000E+00 | −2.3724E+01 | 8.2557E+01 | −1.7680E+02 | 2.3061E+02 | −1.6788E+02 | 5.2311E+01 |
| S5 | −1.8360E−01 | 5.1739E−01 | −4.0682E+00 | 2.0310E+01 | −6.4506E+01 | 1.2870E+02 | −1.5652E+02 | 1.0587E+02 | −3.0195E+01 |
| S6 | −7.2274E−02 | −3.0117E−01 | 1.5032E+00 | −5.2720E+00 | 1.1563E+01 | −1.6159E+01 | 1.3937E+01 | −6.7805E+00 | 1.4366E+00 |
| S7 | 2.7694E−02 | −1.6942E−01 | 4.5854E−01 | −1.3830E+00 | 2.4239E+00 | −2.4666E+00 | 1.4388E+00 | −4.4424E−01 | 5.6299E−02 |
| S8 | 1.4122E−02 | −2.8565E−01 | 5.0339E−01 | −5.7326E−01 | 4.4171E−01 | −2.0744E−01 | 5.5743E−02 | −7.8015E−03 | 4.3379E−04 |
| S9 | −4.9233E−02 | −3.0071E−01 | 3.9289E−01 | −2.3134E−01 | 8.0333E−02 | −1.7444E−02 | 2.3274E−03 | −1.7405E−04 | 5.5544E−06 |
| S10 | −1.0298E−01 | 3.8108E−02 | −8.9834E−03 | 1.1629E−03 | −8.5633E−05 | 4.0065E−06 | −1.2762E−07 | 2.5838E−09 | −2.4230E−11 |

TABLE 24

| f1(mm) | 3.05 | f(mm) | 3.45 |
|---|---|---|---|
| f2(mm) | −4.84 | TTL(mm) | 4.50 |
| f3(mm) | 9.57 | HFOV(°) | 42.7 |
| f4(mm) | 1.60 | | |
| f5(mm) | −1.33 | | |

Figure 16A:
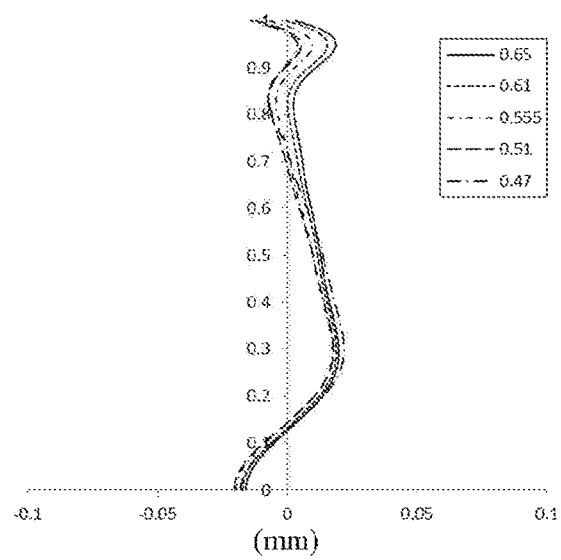
FIG. 16A illustrates a longitudinal aberration curve of the imaging lens assembly according to Embodiment 8.
Figure 16B:
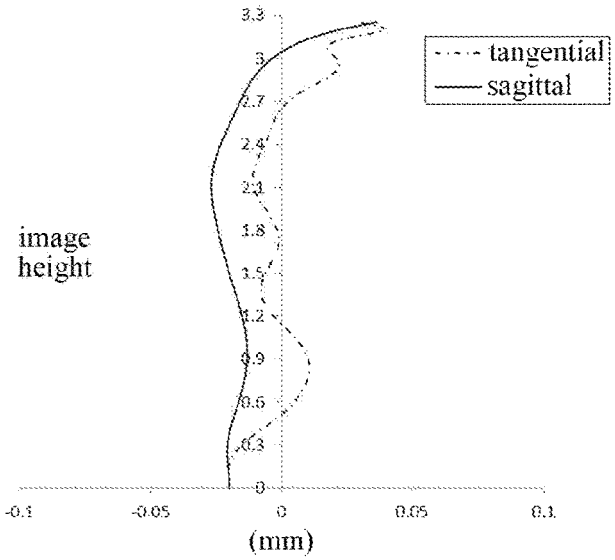
FIG. 16B illustrates an astigmatic curve of the imaging lens assembly according to Embodiment 8.
Figure 16C:
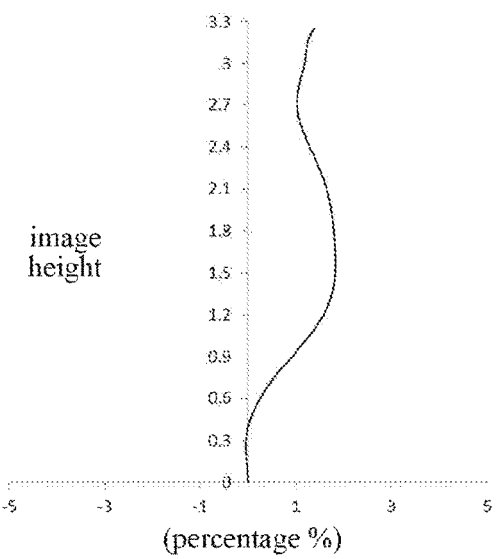
FIG. 16C illustrates a distortion curve of the imaging lens assembly according to Embodiment 8.
Figure 16D:
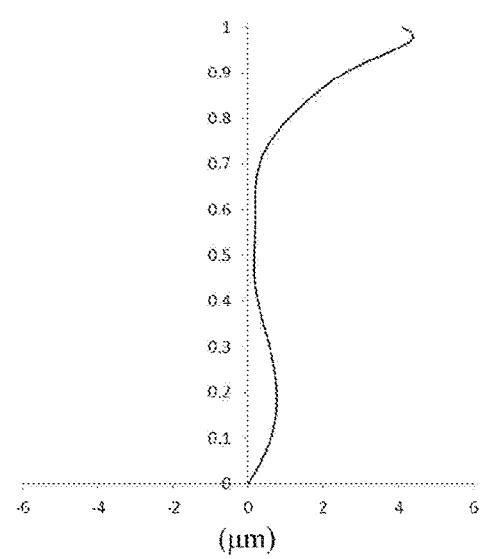
FIG. 16D illustrates a lateral color curve of the imaging lens assembly according to Embodiment 8.

FIG. 16A illustrates a longitudinal aberration curve of the imaging lens assembly according to Embodiment 8, representing deviations of focal points of light of different wavelengths converged after passing through an imaging lens assembly. FIG. 16B illustrates an astigmatic curve of the imaging lens assembly according to Embodiment 8, representing a curvature of a tangential image plane and a curvature of a sagittal image plane. FIG. 16C illustrates a distortion curve of the imaging lens assembly according to Embodiment 8, representing amounts of distortion at different viewing angles. FIG. 16D illustrates a lateral color curve of the imaging lens assembly according to Embodiment 8, representing deviations of different image heights on an image plane after light passes through the imaging lens assembly. It can be seen from FIGS. 16A-16D that the imaging lens assembly according to Embodiment 8 can achieve a good image quality.

Embodiment 9

An imaging lens assembly according to Embodiment 9 of the present disclosure is described below with reference to FIGS. 17-18D. FIG. 17 is a schematic structural diagram illustrating the imaging lens assembly according to Embodiment 9 of the present disclosure.

As shown in FIG. 17, the imaging lens assembly includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface 510. Alternatively, the imaging lens assembly may further include an optical filter E6 having an object-side surface S11 and an image-side surface S12, and the optical filter E6 may be used to correct color deviations. In the imaging lens assembly of this embodiment, an aperture STO for limiting light beams may also be provided. Light from an object sequentially passes through the surfaces S1-S12 and finally forms an image on an image plane S13.

Table 25 shows the surface type, the radius of curvature, the thickness, the material and the conic coefficient of each lens of the imaging lens assembly in Embodiment 9. Table 26 shows the high-order coefficients of each aspheric mirror surface in Embodiment 9. Table 27 shows the effective focal lengths f1-f5 of the lenses, the total effective focal length f of the imaging lens assembly, the distance TTL from the object-side surface S1 of the first lens E1 to the image plane S13 of the imaging lens assembly on the optical axis, and the half of the maximal field-of-view HFOV of the imaging lens assembly in Embodiment 9. Here, the surface type of each aspheric surface may be defined by the formula (1) given in Embodiment 1.

TABLE 25

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.2028 | | | |
| S1 | aspheric | 1.7939 | 0.5635 | 1.546 | 56.11 | −2.3124 |
| S2 | aspheric | −18.5510 | 0.0500 | | | −30.8535 |
| S3 | aspheric | 9.4284 | 0.3000 | 1.666 | 20.37 | 34.6449 |
| S4 | aspheric | 2.3889 | 0.2129 | | | 0.3531 |
| S5 | aspheric | 9.6014 | 0.4398 | 1.546 | 56.11 | 97.2994 |
| S6 | aspheric | −13.8626 | 0.4541 | | | −98.9160 |
| S7 | aspheric | −4.2977 | 0.7624 | 1.536 | 55.77 | −1.8699 |
| S8 | aspheric | −0.7477 | 0.0814 | | | −3.6539 |
| S9 | aspheric | −21.9593 | 0.4262 | 1.546 | 56.11 | 95.0014 |
| S10 | aspheric | 0.7660 | 0.4309 | | | −6.1450 |
| S11 | spherical | infinite | 0.2069 | 1.517 | 64.17 | |
| S12 | spherical | infinite | 0.5719 | | | |
| S13 | spherical | infinite | | | | |

TABLE 26

| surface number | A4 | A6 | A8 | A10 | A12 | A14 | A16 | A18 | A20 |
|---|---|---|---|---|---|---|---|---|---|
| S1 | 1.6170E−02 | 1.6312E−01 | −1.2772E+00 | 5.5578E+00 | −1.5532E+01 | 2.7305E+01 | −2.9255E+01 | 1.7396E+01 | −4.4021E+00 |
| S2 | −1.1089E−01 | 3.4405E−01 | −2.1301E−01 | −2.3938E+00 | 9.1762E+00 | −1.7280E+01 | 1.8730E+01 | −1.1084E+01 | 2.7484E+00 |
| S3 | −1.4910E−01 | 6.0996E−01 | −8.1498E−01 | −1.3208E+00 | 8.1528E+00 | −1.7244E+01 | 2.0010E+01 | −1.2684E+01 | 3.4116E+00 |
| S4 | −1.0257E−01 | 3.4779E−01 | −9.2437E−01 | 3.4466E+00 | −1.0791E+01 | 2.0936E+01 | −2.2987E+01 | 1.3038E+01 | −2.9619E+00 |
| S5 | −1.8466E−01 | 4.7323E−01 | −3.5974E+00 | 1.7203E+01 | −5.3765E+01 | 1.0814E+02 | −1.3559E+02 | 9.6694E+01 | −2.9741E+01 |
| S6 | −8.5703E−02 | −8.3654E−02 | 5.6139E−02 | 3.1134E−01 | −1.9434E+00 | 4.4894E+00 | −5.3612E+00 | 3.2738E+00 | −7.8866E−01 |
| S7 | −5.1583E−02 | 2.8469E−01 | −1.3681E+00 | 2.8779E+00 | −3.5563E+00 | 2.6466E+00 | −1.1516E+00 | 2.6840E−01 | −2.5754E−02 |
| S8 | 6.7960E−02 | −4.5770E−01 | 8.2348E−01 | −9.6077E−01 | 7.4629E−01 | −3.5631E−01 | 9.8715E−02 | −1.4489E−02 | 8.6817E−04 |
| S9 | −4.8232E−03 | −2.8373E−01 | 3.4034E−01 | −1.9201E−01 | 6.3752E−02 | −1.3098E−02 | 1.6340E−03 | −1.1306E−04 | 3.3156E−06 |
| S10 | −8.6121E−02 | 2.7070E−02 | −5.4290E−03 | 6.2575E−04 | −4.3474E−05 | 1.8911E−06 | −5.0706E−08 | 7.6306E−10 | −4.9024E−12 |

TABLE 27

| f1(mm) | 3.03 | f(mm) | 3.45 |
|---|---|---|---|
| f2(mm) | −4.88 | TTL(mm) | 4.50 |
| f3(mm) | 10.46 | HFOV(°) | 43.0 |
| f4(mm) | 1.57 | | |
| f5(mm) | −1.35 | | |

Figures 18C, 18D:
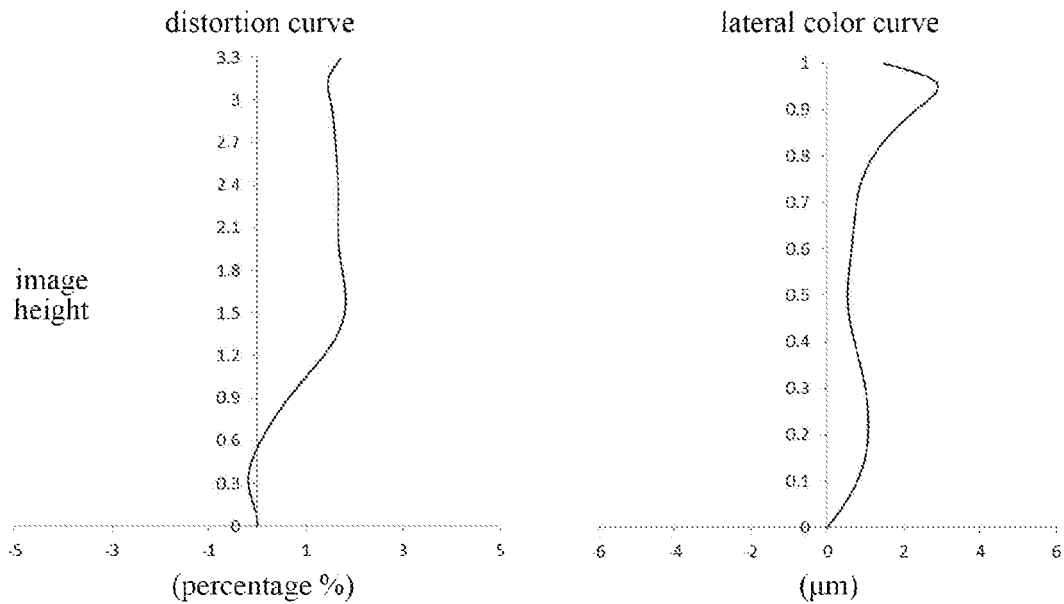
FIG. 18C illustrates a distortion curve of the imaging lens assembly according to Embodiment 9.
FIG. 18D illustrates a lateral color curve of the imaging lens assembly according to Embodiment 9.

FIG. 18A illustrates a longitudinal aberration curve of the imaging lens assembly according to Embodiment 9, representing deviations of focal points of light of different wavelengths converged after passing through an imaging lens assembly. FIG. 18B illustrates an astigmatic curve of the imaging lens assembly according to Embodiment 9, representing a curvature of a tangential image plane and a curvature of a sagittal image plane. FIG. 18C illustrates a distortion curve of the imaging lens assembly according to Embodiment 9, representing amounts of distortion at different viewing angles. FIG. 18D illustrates a lateral color curve of the imaging lens assembly according to Embodiment 9, representing deviations of different image heights on an image plane after light passes through the imaging lens assembly. It can be seen from FIGS. 18A-18D that the imaging lens assembly according to Embodiment 9 can achieve a good image quality.

Embodiment 10

Figure 19:
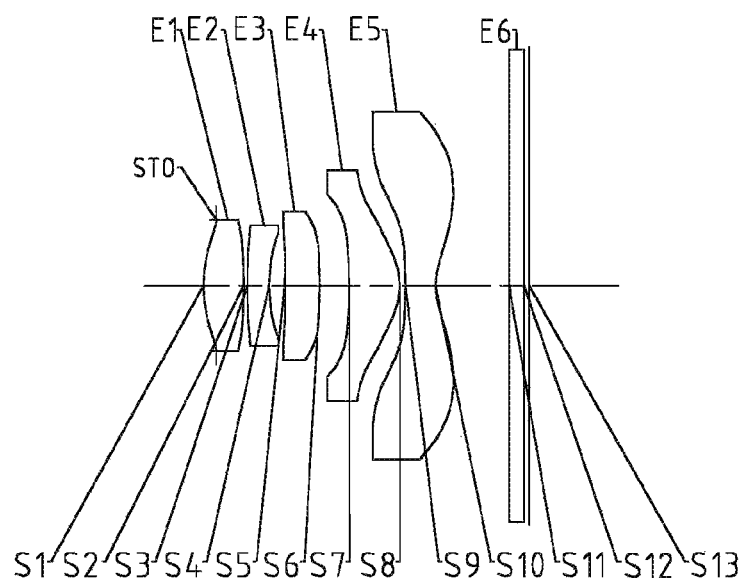
FIG. 19 is a schematic structural diagram illustrating an imaging lens assembly according to Embodiment 10 of the present disclosure.

An imaging lens assembly according to Embodiment 10 of the present disclosure is described below with reference to FIGS. 19-20D. FIG. 19 is a schematic structural diagram illustrating the imaging lens assembly according to Embodiment 10 of the present disclosure.

As shown in FIG. 19, the imaging lens assembly includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface 510. Alternatively, the imaging lens assembly may further include an optical filter E6 having an object-side surface S11 and an image-side surface S12, and the optical filter E6 may be used to correct color deviations. In the imaging lens assembly of this embodiment, an aperture STO for limiting light beams may also be provided. Light from an object sequentially passes through the surfaces S1-S12 and finally forms an image on an image plane S13.

Table 28 shows the surface type, the radius of curvature, the thickness, the material and the conic coefficient of each lens of the imaging lens assembly in Embodiment 10. Table 29 shows the high-order coefficients of each aspheric mirror surface in Embodiment 10. Table 30 shows the effective focal lengths f1-f5 of the lenses, the total effective focal length f of the imaging lens assembly, the distance TTL from the object-side surface S1 of the first lens E1 to the image plane S13 of the imaging lens assembly on the optical axis, and the half of the maximal field-of-view HFOV of the imaging lens assembly in Embodiment 10. Here, the surface type of each aspheric surface may be defined by the formula (1) given in Embodiment 1.

TABLE 28

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.1786 | | | |
| S1 | aspheric | 1.9080 | 0.5571 | 1.546 | 56.11 | −2.8714 |
| S2 | aspheric | −8.1617 | 0.0500 | | | −99.0000 |
| S3 | aspheric | 9.5322 | 0.3000 | 1.666 | 20.37 | 66.8457 |
| S4 | aspheric | 2.1543 | 0.2145 | | | 0.8177 |
| S5 | aspheric | 9.1615 | 0.4899 | 1.546 | 56.11 | 96.0713 |
| S6 | aspheric | −13.8626 | 0.4019 | | | 73.8503 |
| S7 | aspheric | −7.4029 | 0.7008 | 1.536 | 55.77 | 29.0541 |
| S8 | aspheric | −0.8218 | 0.0751 | | | −4.7291 |
| S9 | aspheric | −21.0588 | 0.4158 | 1.546 | 56.11 | 82.5468 |
| S10 | aspheric | 0.8272 | 1.0187 | | | −6.5846 |
| S11 | spherical | infinite | 0.2069 | 1.517 | 64.17 | |
| S12 | spherical | infinite | 0.0694 | | | |
| S13 | spherical | infinite | | | | |

TABLE 29

| surface number | A4 | A6 | A8 | A10 | A12 | A14 | A16 | A18 | A20 |
|---|---|---|---|---|---|---|---|---|---|
| S1 | −6.5864E−04 | 2.6512E−01 | −1.9736E+00 | 8.1817E+00 | −2.1749E+01 | 3.6653E+01 | −3.7927E+01 | 2.1933E+01 | −5.4248E+00 |
| S2 | −7.5736E−02 | 8.3354E−02 | 1.6035E+00 | −1.1318E+01 | 3.6276E+01 | −6.8173E+01 | 7.6570E+01 | −4.7559E+01 | 1.2553E+01 |
| S3 | −1.1482E−01 | 5.6513E−01 | −7.3437E−01 | −1.4682E+00 | 6.8992E+00 | −1.0863E+01 | 8.1549E+00 | −2.6467E+00 | 2.0049E+01 |
| S4 | −1.1355E−01 | 2.2395E−01 | 7.1846E−01 | −5.8443E+00 | 1.8999E+01 | −3.6443E+01 | 4.2313E+01 | −2.7177E+01 | 7.3711E+00 |
| S5 | −2.2558E−01 | 9.5838E−01 | −7.2243E−00 | 3.4833E+01 | −1.0762E+02 | 2.1144E+02 | −2.5581E+02 | 1.7354E+02 | −5.0183E+01 |
| S6 | −7.9954E−02 | −3.4489E−01 | 1.8706E+00 | −6.6936E+00 | 1.4852E+01 | −2.0932E+01 | 1.8214E+01 | −8.9582E+00 | 1.9215E+00 |
| S7 | −1.0244E−02 | 7.9054E−02 | −4.1335E−01 | 8.0505E−01 | −9.9406E−01 | 8.2148E−01 | −4.5522E−01 | 1.5249E−01 | −2.2519E−02 |
| S8 | −8.7631E−02 | 1.2833E−01 | −2.4701E−01 | 2.8193E−01 | −1.6161E−01 | 5.0140E−02 | −8.5614E−03 | 7.4926E−04 | −2.5716E−05 |
| S9 | −9.7283E−02 | −9.0254E−02 | 1.0163E−01 | −2.8873E−02 | −3.8986E−04 | 1.8102E−03 | −3.7601E−04 | 3.0304E−05 | −7.7679E−07 |
| S10 | −1.0098E−01 | 3.8787E−02 | −1.0864E−02 | 1.8500E−03 | −1.8731E−04 | 1.1087E−05 | −3.7625E−07 | 6.7858E−09 | −5.0439E−11 |

TABLE 30

| f1(mm) | 2.89 | f(mm) | 3.45 |
|---|---|---|---|
| f2(mm) | −4.25 | TTL(mm) | 4.50 |
| f3(mm) | 10.18 | HFOV(°) | 43.0 |
| f4(mm) | 1.66 | | |
| f5(mm) | −1.45 | | |

Figures 20A, 20B:
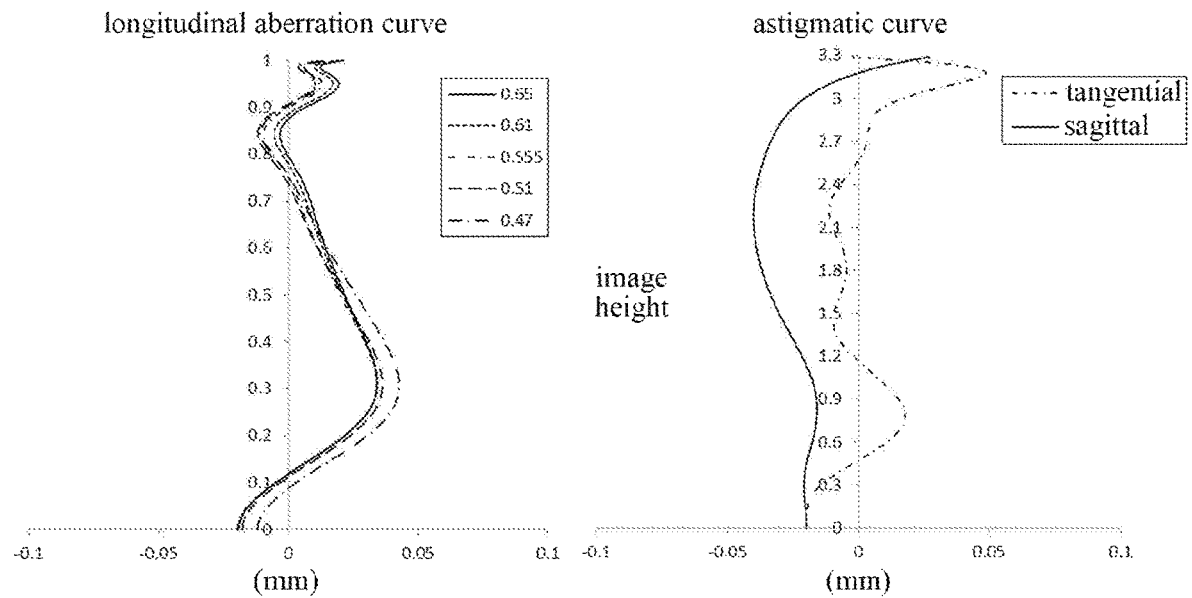
FIG. 20A illustrates a longitudinal aberration curve of the imaging lens assembly according to Embodiment 10.
FIG. 20B illustrates an astigmatic curve of the imaging lens assembly according to Embodiment 10.
Figures 20C, 20D:
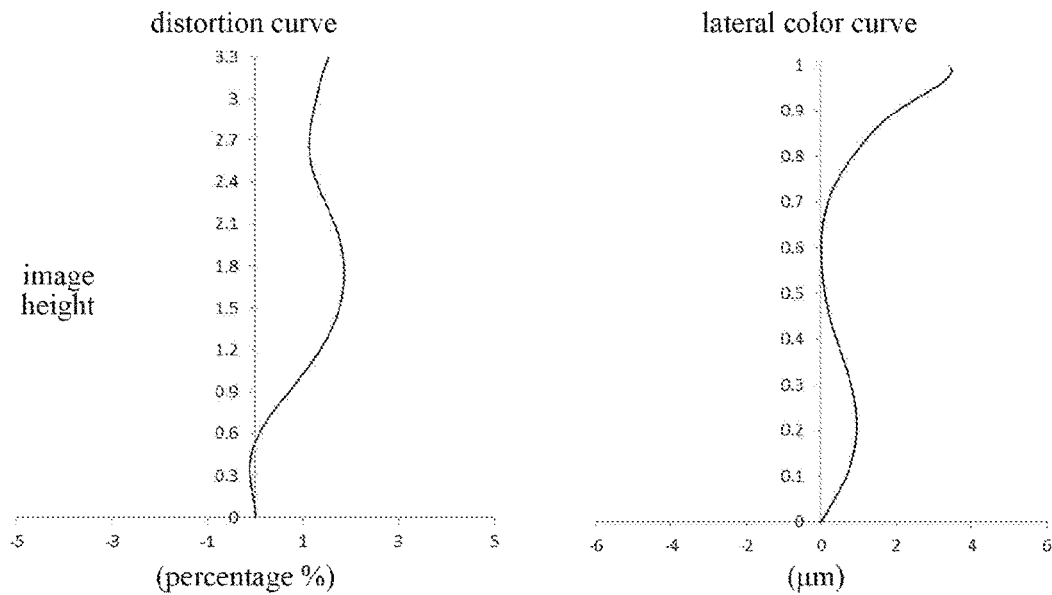
FIG. 20C illustrates a distortion curve of the imaging lens assembly according to Embodiment 10.
FIG. 20D illustrates a lateral color curve of the imaging lens assembly according to Embodiment 10.

FIG. 20A illustrates a longitudinal aberration curve of the imaging lens assembly according to Embodiment 10, representing deviations of focal points of light of different wavelengths converged after passing through an imaging lens assembly. FIG. 20B illustrates an astigmatic curve of the imaging lens assembly according to Embodiment 10, representing a curvature of a tangential image plane and a curvature of a sagittal image plane. FIG. 20C illustrates a distortion curve of the imaging lens assembly according to Embodiment 10, representing amounts of distortion at different viewing angles. FIG. 20D illustrates a lateral color curve of the imaging lens assembly according to Embodiment 10, representing deviations of different image heights on an image plane after light passes through the imaging lens assembly. It can be seen from FIGS. 20A-20D that the imaging lens assembly according to Embodiment 10 can achieve a good image quality.

Embodiment 11

Figure 21:
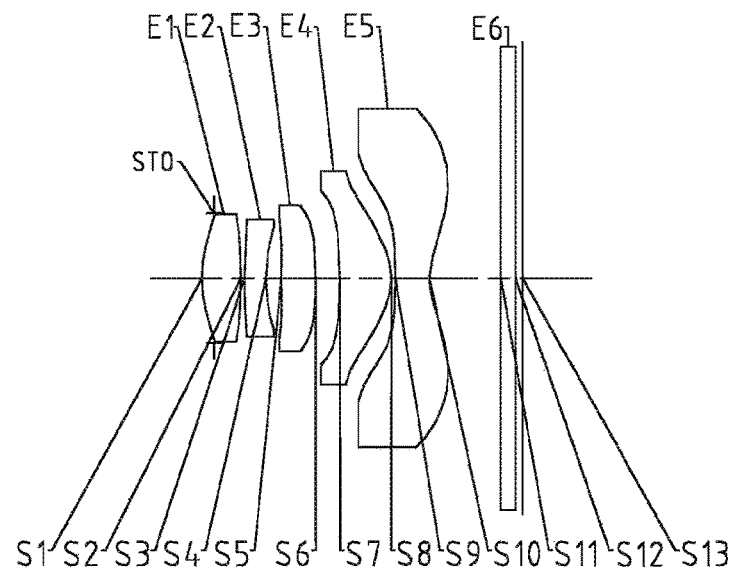
FIG. 21 is a schematic structural diagram illustrating an imaging lens assembly according to Embodiment 11 of the present disclosure.

An imaging lens assembly according to Embodiment 11 of the present disclosure is described below with reference to FIGS. 21-22D. FIG. 21 is a schematic structural diagram illustrating the imaging lens assembly according to Embodiment 11 of the present disclosure.

As shown in FIG. 21, the imaging lens assembly includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface 510. Alternatively, the imaging lens assembly may further include an optical filter E6 having an object-side surface S11 and an image-side surface S12, and the optical filter E6 may be used to correct color deviations. In the imaging lens assembly of this embodiment, an aperture STO for limiting light beams may also be provided. Light from an object sequentially passes through the surfaces S1-S12 and finally forms an image on an image plane S13.

Table 31 shows the surface type, the radius of curvature, the thickness, the material and the conic coefficient of each lens of the imaging lens assembly in Embodiment 11. Table 32 shows the high-order coefficients of each aspheric mirror surface in Embodiment 11. Table 33 shows the effective focal lengths fc-f5 of the lenses, the total effective focal length f of the imaging lens assembly, the distance TTL from the object-side surface S1 of the first lens E1 to the image plane S13 of the imaging lens assembly on the optical axis, and the half of the maximal field-of-view HFOV of the imaging lens assembly in Embodiment 11. Here, the surface type of each aspheric surface may be defined by the formula (1) given in Embodiment 1.

TABLE 31

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.1699 | | | |
| S1 | aspheric | 1.9397 | 0.5460 | 1.546 | 56.11 | −2.8441 |
| S2 | aspheric | −8.1338 | 0.0500 | | | −98.8921 |
| S3 | aspheric | 12.0903 | 0.3000 | 1.666 | 20.37 | 40.3333 |
| S4 | aspheric | 2.3243 | 0.2176 | | | 0.7765 |
| S5 | aspheric | 9.6192 | 0.4752 | 1.546 | 56.11 | 93.9430 |
| S6 | aspheric | −13.8626 | 0.3534 | | | 97.6201 |
| S7 | aspheric | −7.0154 | 0.7228 | 1.536 | 55.77 | 22.9756 |
| S8 | aspheric | −0.7970 | 0.0521 | | | −4.3121 |
| S9 | aspheric | −9.9532 | 0.4793 | 1.546 | 56.11 | −8.0169 |
| S10 | aspheric | 0.8612 | 0.9989 | | | −7.2354 |
| S11 | spherical | infinite | 0.2069 | 1.517 | 64.17 | |
| S12 | spherical | infinite | 0.0978 | | | |
| S13 | spherical | infinite | | | | |

TABLE 32

| surface number | A4 | A6 | A8 | A10 | A12 | A14 | A16 | A18 | A20 |
|---|---|---|---|---|---|---|---|---|---|
| S1 | 6.1078E−03 | 1.5119E−01 | −1.2572E+00 | 6.0080E+00 | −1.8676E+01 | 3.6204E+01 | −4.2276E+01 | 2.7137E+01 | −7.3571E+00 |
| S2 | −5.9763E−02 | 4.0434E−02 | 1.4639E+00 | −9.9991E+00 | 3.2662E+01 | −6.4394E+01 | 7.7090E+01 | −5.1379E+01 | 1.4562E+01 |
| S3 | −9.5365E−02 | 4.8853E−01 | −5.0139E−01 | −1.7367E+00 | 6.1901E+00 | −7.8566E+00 | 3.6480E+00 | 5.2344E−01 | −6.6664E−01 |
| S4 | −1.0963E−01 | 2.4318E−01 | 1.7396E−02 | −6.4390E−01 | −4.5692E−01 | 4.8674E+00 | −7.7726E+00 | 4.9139E+00 | −1.0025E+00 |
| S5 | −1.6986E−01 | −6.8018E−02 | 1.3024E+00 | −7.1845E+00 | 2.1870E+01 | −3.9978E+01 | 4.2733E+01 | −2.4084E+01 | 5.5563E+00 |
| S6 | −6.7393E−02 | −5.9417E−01 | 3.3598E+00 | −1.1677E+01 | 2.5068E+01 | −3.3920E+01 | 2.8147E+01 | −1.3120E+01 | 2.6498E+00 |
| S7 | −5.5772E−02 | 3.1303E−01 | −1.0949E+00 | 2.0993E+00 | −2.5929E+00 | 2.0812E+00 | −1.0580E+00 | 3.0914E−01 | −3.9144E−02 |
| S8 | −6.8452E−02 | 8.4429E−02 | −1.7360E−01 | 1.8620E−01 | −9.5789E−02 | 2.6178E−02 | −3.8581E−03 | 2.8067E−04 | −7.3260E−06 |
| S9 | −2.1331E−02 | −1.4612E−01 | 8.7600E−02 | −7.4001E−03 | −6.4216E−03 | 2.0880E−03 | −2.4683E−04 | 1.0189E−05 | 4.5889E−08 |
| S10 | −6.6143E−02 | 1.2830E−02 | −1.7927E−03 | 1.3794E−04 | −6.6076E−06 | 1.9491E−07 | −3.4086E−09 | 3.2308E−11 | −1.2769E−13 |

TABLE 33

| f1(mm) | 2.92 | f(mm) | 3.39 |
|---|---|---|---|
| f2(mm) | −4.37 | TTL(mm) | 4.50 |
| f3(mm) | 10.48 | HFOV(°) | 43.5 |
| f4(mm) | 1.61 | | |
| f5(mm) | −1.43 | | |

Figures 22A, 22B:
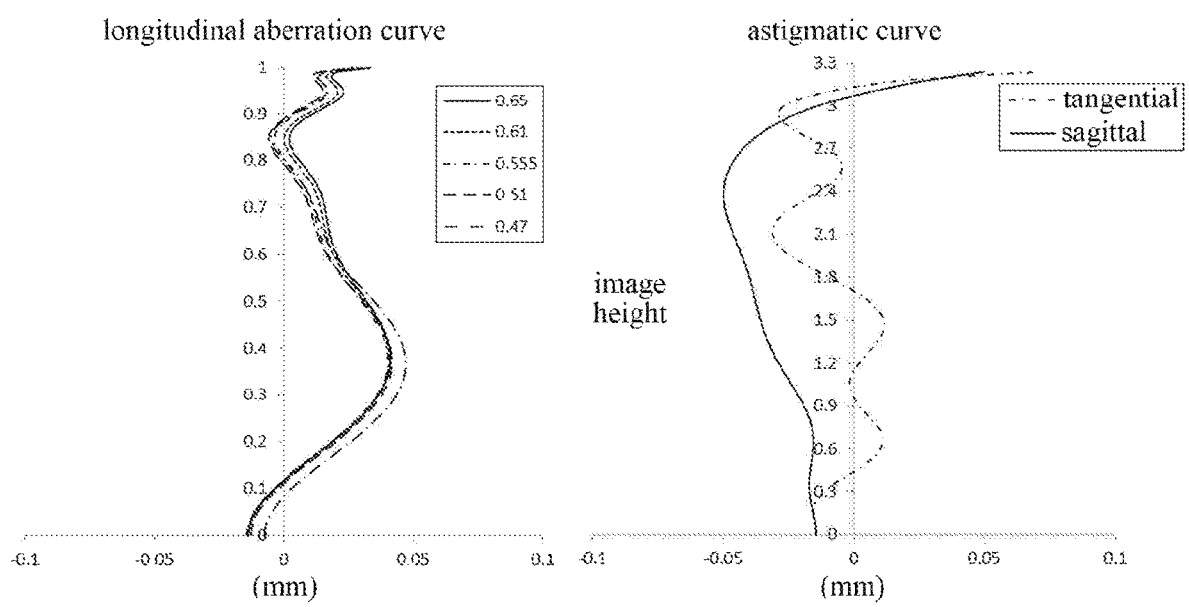
FIG. 22A illustrates a longitudinal aberration curve of the imaging lens assembly according to Embodiment 11.
FIG. 22B illustrates an astigmatic curve of the imaging lens assembly according to Embodiment 11.

FIG. 22A illustrates a longitudinal aberration curve of the imaging lens assembly according to Embodiment 11, representing deviations of focal points of light of different wavelengths converged after passing through an imaging lens assembly. FIG. 22B illustrates an astigmatic curve of the imaging lens assembly according to Embodiment 11, representing a curvature of a tangential image plane and a curvature of a sagittal image plane. FIG. 22C illustrates a distortion curve of the imaging lens assembly according to Embodiment 11, representing amounts of distortion at different viewing angles. FIG. 22D illustrates a lateral color curve of the imaging lens assembly according to Embodiment 11, representing deviations of different image heights on an image plane after light passes through the imaging lens assembly. It can be seen from FIGS. 22A-22D that the imaging lens assembly according to Embodiment 11 can achieve a good image quality.

Embodiment 12

An imaging lens assembly according to Embodiment 12 of the present disclosure is described below with reference to FIGS. 23-24D. FIG. 23 is a schematic structural diagram illustrating the imaging lens assembly according to Embodiment 12 of the present disclosure.

As shown in FIG. 23, the imaging lens assembly includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface 510. Alternatively, the imaging lens assembly may further include an optical filter E6 having an object-side surface S11 and an image-side surface S12, and the optical filter E6 may be used to correct color deviations. In the imaging lens assembly of this embodiment, an aperture STO for limiting light beams may also be provided. Light from an object sequentially passes through the surfaces S1-S12 and finally forms an image on an image plane S13.

Table 34 shows the surface type, the radius of curvature, the thickness, the material and the conic coefficient of each lens of the imaging lens assembly in Embodiment 12. Table 35 shows the high-order coefficients of each aspheric mirror surface in Embodiment 12. Table 36 shows the effective focal lengths f1-f5 of the lenses, the total effective focal length f of the imaging lens assembly, the distance TTL from the object-side surface S1 of the first lens E1 to the image plane S13 of the imaging lens assembly on the optical axis, and the half of the maximal field-of-view HFOV of the imaging lens assembly in Embodiment 12. Here, the surface type of each aspheric surface may be defined by the formula (1) given in Embodiment 1.

TABLE 34

| surface number | surface type | radius of curvature | thickness | material | | conic coefficient |
|---|---|---|---|---|---|---|
| | | | | refractive index | abbe number | |
| OBJ | spherical | infinite | infinite | | | |
| STO | spherical | infinite | −0.2093 | | | |
| S1 | aspheric | 1.8248 | 0.5882 | 1.546 | 56.11 | −2.5486 |
| S2 | aspheric | −21.2812 | 0.0500 | | | 96.7220 |
| S3 | aspheric | 5.6071 | 0.3000 | 1.666 | 20.37 | 8.4295 |
| S4 | aspheric | 2.1452 | 0.2473 | | | 0.9104 |
| S5 | aspheric | 11.5927 | 0.4816 | 1.546 | 56.11 | 76.3366 |
| S6 | aspheric | −13.8626 | 0.4270 | | | 99.0000 |
| S7 | aspheric | −7.4437 | 0.7472 | 1.536 | 55.77 | 24.8492 |
| S8 | aspheric | −0.8283 | 0.0500 | | | −4.5055 |
| S9 | aspheric | −68.0866 | 0.4480 | 1.546 | 56.11 | −99.0000 |
| S10 | aspheric | 0.7747 | 0.7589 | | | −6.1153 |
| S11 | spherical | infinite | 0.2069 | 1.517 | 64.17 | |
| S12 | spherical | infinite | 0.1949 | | | |
| S13 | spherical | infinite | | | | |

TABLE 35

| surface number | A4 | A6 | A8 | A10 | A12 | A14 | A16 | A18 | A20 |
|---|---|---|---|---|---|---|---|---|---|
| S1 | 1.2314E−02 | 1.7400E−01 | −1.2548E+00 | 4.7281E+00 | −1.1277E+01 | 1.6866E+01 | −1.5406E+01 | 7.8463E+00 | −1.7087E+00 |
| S2 | −1.7217E−01 | 6.3972E−01 | −1.4563E+00 | 1.5333E+00 | 3.9677E−01 | −3.6143E+00 | 4.8006E+00 | −2.8443E+00 | 6.4503E−01 |
| S3 | −2.1349E−01 | 9.4310E−01 | −2.4686E+00 | 5.2149E+00 | −9.4268E+00 | 1.3909E+01 | −1.4778E+01 | 9.5487E+00 | −2.7663E+00 |
| S4 | −1.0581E−01 | 6.2463E−02 | 1.9338E+00 | −1.1429E+01 | 3.5794E+01 | −6.8533E+01 | 7.9964E+01 | −5.2099E+01 | 1.4555E+01 |
| S5 | −1.8257E−01 | 5.5971E−01 | −4.3093E+00 | 2.0448E+01 | −6.1253E+01 | 1.1549E+02 | −1.3292E+02 | 8.4986E+01 | −2.2810E+01 |
| S6 | −7.2449E−02 | −2.6515E−01 | 1.1779E+00 | −3.8082E+00 | 7.8436E+00 | −1.0447E+01 | 8.7049E+00 | −4.1433E+00 | 8.7096E−01 |
| S7 | 3.5209E−02 | −1.5430E−01 | 2.5940E−01 | −4.3767E−01 | 4.4675E−01 | −2.3447E−01 | 2.6952E−02 | 2.5715E−02 | −7.7502E−03 |
| S8 | −4.1189E−02 | −1.4612E−01 | 4.1566E−01 | −5.9894E−01 | 5.1729E−01 | −2.6362E−01 | 7.7695E−02 | −1.2290E−02 | 8.0927E−04 |
| S9 | −2.3139E−01 | 1.0707E−01 | −5.0467E−02 | 4.3872E−02 | −2.4150E−02 | 7.3537E−03 | −1.2723E−03 | 1.1879E−04 | −4.6862E−06 |
| S10 | −1.3251E−01 | 8.4165E−02 | −4.2858E−02 | 1.5610E−02 | −3.9370E−03 | 6.4799E−04 | −6.4941E−05 | 3.5594E−06 | −8.1398E−08 |

TABLE 36

| f1(mm) | 3.11 | f(mm) | 3.45 |
|---|---|---|---|
| f2(mm) | −5.40 | TTL(mm) | 4.50 |
| f3(mm) | 11.64 | HFOV(°) | 43.0 |
| f4(mm) | 1.67 | | |
| f5(mm) | −1.40 | | |

Figure 24A:
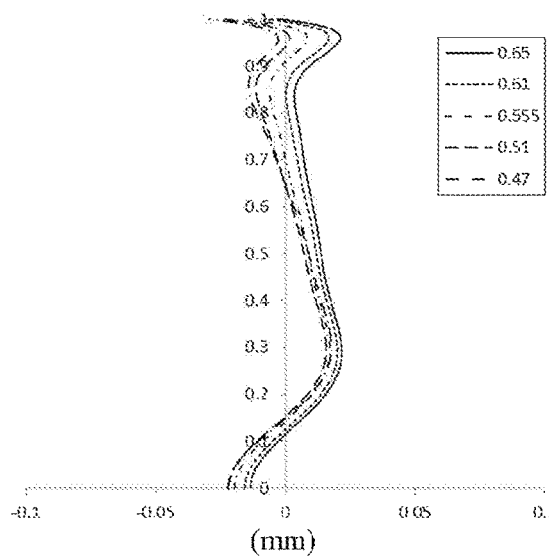
FIG. 24A illustrates a longitudinal aberration curve of the imaging lens assembly according to Embodiment 12.
Figure 24B:
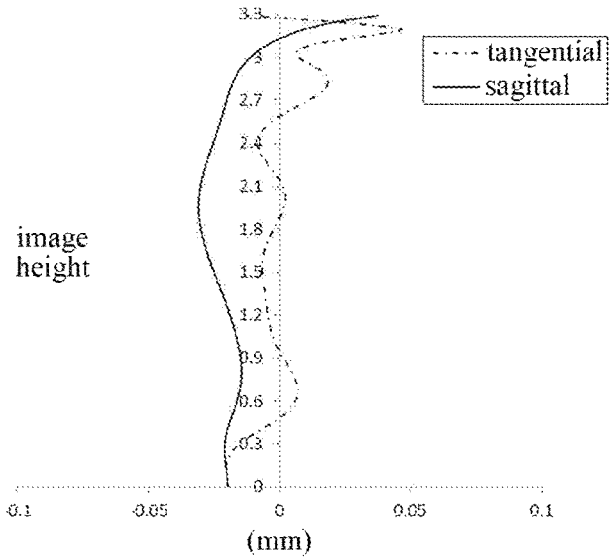
FIG. 24B illustrates an astigmatic curve of the imaging lens assembly according to Embodiment 12.
Figure 24C:
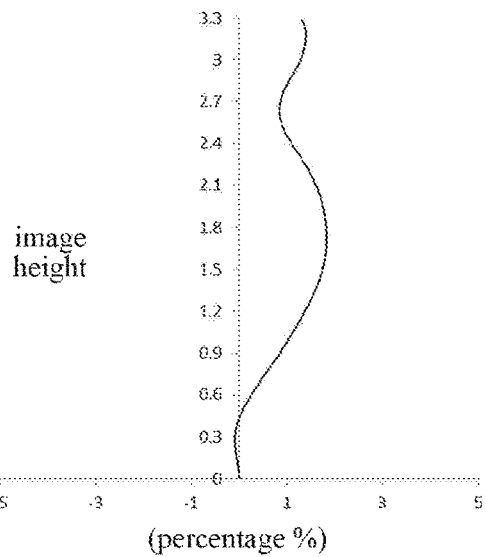
FIG. 24C illustrates a distortion curve of the imaging lens assembly according to Embodiment 12.
Figure 24D:
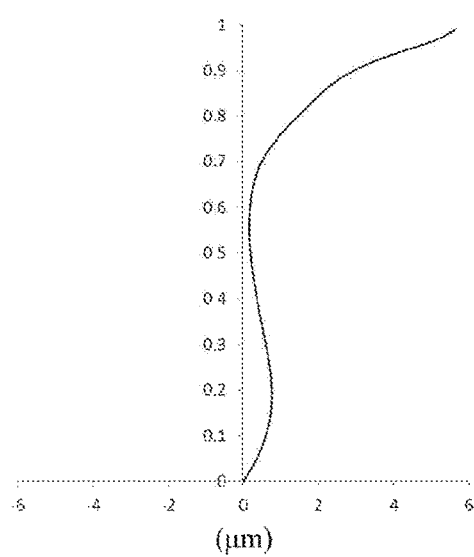
FIG. 24D illustrates a lateral color curve of the imaging lens assembly according to Embodiment 12.

FIG. 24A illustrates a longitudinal aberration curve of the imaging lens assembly according to Embodiment 12, representing deviations of focal points of light of different wavelengths converged after passing through an imaging lens assembly. FIG. 24B illustrates an astigmatic curve of the imaging lens assembly according to Embodiment 12, representing a curvature of a tangential image plane and a curvature of a sagittal image plane. FIG. 24C illustrates a distortion curve of the imaging lens assembly according to Embodiment 12, representing amounts of distortion at different viewing angles. FIG. 24D illustrates a lateral color curve of the imaging lens assembly according to Embodiment 12, representing deviations of different image heights on an image plane after light passes through the imaging lens assembly. It can be seen from FIGS. 24A-24D that the imaging lens assembly according to Embodiment 12 can achieve a good image quality.

Embodiment 13

Figure 25:
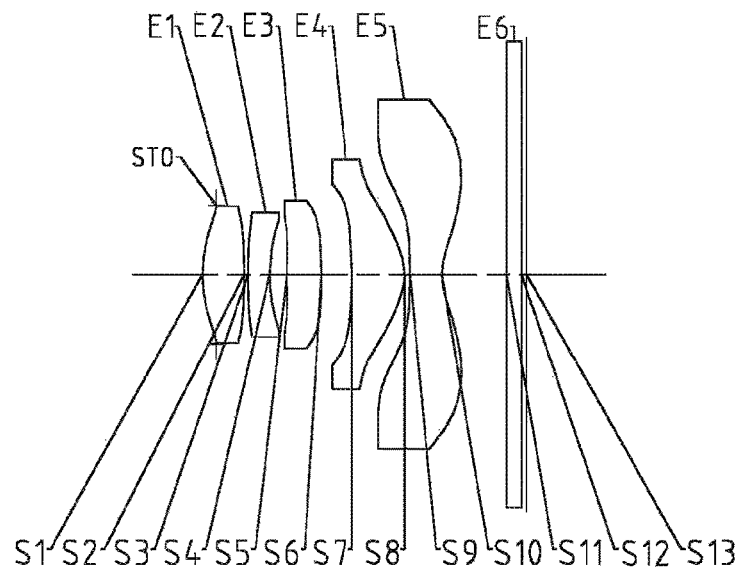
FIG. 25 is a schematic structural diagram illustrating an imaging lens assembly according to Embodiment 13 of the present disclosure.

An imaging lens assembly according to Embodiment 13 of the present disclosure is described below with reference to FIGS. 25-26D. FIG. 25 is a schematic structural diagram illustrating the imaging lens assembly according to Embodiment 13 of the present disclosure.

As shown in FIG. 25, the imaging lens assembly includes, along an optical axis, five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface 510. Alternatively, the imaging lens assembly may further include an optical filter E6 having an object-side surface S11 and an image-side surface S12, and the optical filter E6 may be used to correct color deviations. In the imaging lens assembly of this embodiment, an aperture STO for limiting light beams may also be provided. Light from an object sequentially passes through the surfaces S1-S12 and finally forms an image on an image plane S13.

Table 37 shows the surface type, the radius of curvature, the thickness, the material and the conic coefficient of each lens of the imaging lens assembly in Embodiment 13. Table 38 shows the high-order coefficients of each aspheric mirror surface in Embodiment 13. Table 39 shows the effective focal lengths f1-f5 of the lenses, the total effective focal length f of the imaging lens assembly, the distance TTL from the object-side surface S1 of the first lens E1 to the image plane S13 of the imaging lens assembly on the optical axis, and the half of the maximal field-of-view HFOV of the imaging lens assembly in Embodiment 13. Here, the surface type of each aspheric surface may be defined by the formula (1) given in Embodiment 1.

TABLE 37

| surface number | surface type | radius of curvature | thickness | material | | conic coefficient |
| | | | | refractive index | abbe number | |
|---|---|---|---|---|---|---|
| OBJ | spherical | infinite | infinite | | | |
| STO | spherical | infinite | −0.1909 | | | |
| S1 | aspheric | 1.9271 | 0.5805 | 1.546 | 56.11 | −2.7545 |
| S2 | aspheric | −8.4697 | 0.0526 | | | −98.3028 |
| S3 | aspheric | 8.6447 | 0.3000 | 1.666 | 20.37 | 61.5837 |
| S4 | aspheric | 2.2445 | 0.2397 | | | 0.7448 |
| S5 | aspheric | 10.9157 | 0.4776 | 1.546 | 56.11 | 86.1136 |
| S6 | aspheric | −13.8626 | 0.4285 | | | 60.6968 |
| S7 | aspheric | −7.2832 | 0.7279 | 1.536 | 55.77 | 25.3624 |
| S8 | aspheric | −0.8150 | 0.0791 | | | −4.6194 |
| S9 | aspheric | −18.5382 | 0.4381 | 1.546 | 56.11 | −44.7564 |
| S10 | aspheric | 0.8021 | 0.8991 | | | −6.0428 |
| S11 | spherical | infinite | 0.2069 | 1.517 | 64.17 | |
| S12 | spherical | infinite | 0.0700 | | | |
| S13 | spherical | infinite | | | | |

TABLE 38

| surface number | A4 | A6 | A8 | A10 | A12 | A14 | A16 | A18 | A20 |
|---|---|---|---|---|---|---|---|---|---|
| S1 | 6.0069E−03 | 1.6784E−01 | −1.2415E+00 | 4.7729E+00 | −1.1625E+01 | 1.7754E+01 | −1.6555E+01 | 8.6032E+00 | −1.9111E+00 |
| S2 | −8.0700E−02 | 2.6162E−01 | −2.4910E−01 | −1.8014E+00 | 7.5359E+00 | −1.4309E+01 | 1.5077E+01 | −8.4736E+00 | 1.9748E+00 |
| S3 | −1.0784E−01 | 5.4620E−01 | −1.0807E+00 | 2.1444E−01 | 4.6725E+00 | −1.3140E+01 | 1.7700E+01 | −1.2367E+01 | 3.5618E+00 |
| S4 | −1.0750E−01 | 2.9853E−01 | −4.6220E−01 | 9.9610E−01 | −3.9322E+00 | 1.1357E+01 | −1.8479E+01 | 1.5732E+01 | −5.4139E+00 |
| S5 | −2.2934E−01 | 1.1405E+00 | −9.2030E+00 | 4.5162E+01 | −1.3914E+02 | 2.6925E+02 | −3.1754E+02 | 2.0807E+02 | −5.7681E+01 |
| S6 | −8.9659E−02 | −2.0145E−01 | 1.1124E+00 | −4.3707E+00 | 1.0305E+01 | −1.5111E+01 | 1.3481E+01 | −6.7263E+00 | 1.4535E+00 |
| S7 | 8.3968E−03 | 3.0137E−02 | −1.6752E−01 | 6.8817E−02 | 2.3315E−01 | −3.9035E−01 | 2.6107E−01 | −8.2819E−02 | 1.0439E−02 |
| S8 | −6.7394E−02 | 5.4299E−02 | −7.8410E−02 | 4.9968E−02 | 2.1714E−02 | −3.6314E−02 | 1.5859E−02 | −3.0879E−03 | 2.3255E−04 |
| S9 | −8.2444E−02 | −1.5142E−01 | 1.9649E−01 | −1.0273E−01 | 3.1704E−02 | −6.3052E−03 | 8.0183E−04 | −5.9420E−05 | 1.9408E−06 |
| S10 | −1.0531E−01 | 4.1536E−02 | −8.8601E−03 | −9.0760E−04 | 1.1907E−03 | −3.6582E−04 | 5.8046E−05 | −4.7651E−06 | 1.5895E−07 |

TABLE 39

| f1(mm) | 2.93 | f(mm) | 3.41 |
|---|---|---|---|
| f2(mm) | −4.64 | TTL(mm) | 4.50 |
| f3(mm) | 11.26 | HFOV(°) | 43.4 |
| f4(mm) | 1.65 | | |
| f5(mm) | −1.40 | | |

Figures 26A, 26B:
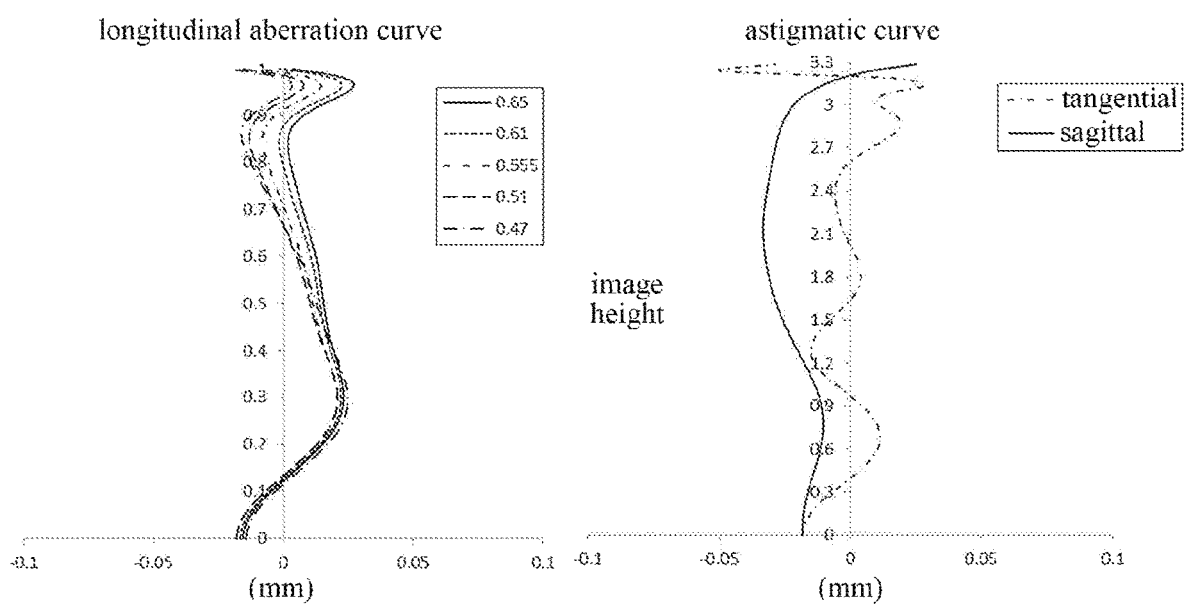
FIG. 26A illustrates a longitudinal aberration curve of the imaging lens assembly according to Embodiment 13.
FIG. 26B illustrates an astigmatic curve of the imaging lens assembly according to Embodiment 13.

FIG. 26A illustrates a longitudinal aberration curve of the imaging lens assembly according to Embodiment 13, representing deviations of focal points of light of different wavelengths converged after passing through an imaging lens assembly. FIG. 26B illustrates an astigmatic curve of the imaging lens assembly according to Embodiment 13, representing a curvature of a tangential image plane and a curvature of a sagittal image plane. FIG. 26C illustrates a distortion curve of the imaging lens assembly according to Embodiment 13, representing amounts of distortion at different viewing angles. FIG. 26D illustrates a lateral color curve of the imaging lens assembly according to Embodiment 13, representing deviations of different image heights on an image plane after light passes through the imaging lens assembly. It can be seen from FIGS. 26A-26D that the imaging lens assembly according to Embodiment 13 can achieve a good image quality.

To sum up, Embodiment 1 to Embodiment 13 respectively satisfy the relationships shown in Table 40 below.

TABLE 40

| Conditional expression | Embodiment | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| f/EPD | 1.78 | 1.80 | 1.82 | 1.90 | 1.90 | 1.79 | 1.80 | 1.90 | 1.90 | 1.90 | 1.90 | 1.80 | 1.80 |
| β5 | 1.30 | 4.02 | 0.76 | 0.60 | 2.28 | 1.40 | 1.12 | −1.39 | −6.09 | −6.76 | −14.25 | −4.53 | −1.50 |
| f/f4 | 2.06 | 1.99 | 2.17 | 1.99 | 1.97 | 1.99 | 2.13 | 2.16 | 2.20 | 2.08 | 2.10 | 2.06 | 2.07 |
| f1/f5 | −2.20 | −2.10 | −2.31 | −2.09 | −2.10 | −2.08 | −2.27 | −2.28 | −2.25 | −2.00 | −2.05 | −2.22 | −2.10 |
| f/f2 | −0.67 | −0.61 | −0.68 | −0.70 | −0.71 | −0.62 | −0.67 | −0.71 | −0.71 | −0.81 | −0.78 | −0.64 | −0.74 |
| f12/f3 | 0.52 | 0.44 | 0.60 | 0.60 | 0.47 | 0.55 | 0.55 | 0.63 | 0.57 | 0.62 | 0.61 | 0.48 | 0.52 |
| β2 | 24.41 | 27.53 | 23.95 | 22.36 | 21.98 | 24.98 | 23.77 | 22.18 | 19.01 | 21.63 | 19.29 | 21.57 | 21.33 |
| (R1 + R2)/(R1 − R2) | −0.82 | −0.84 | −0.80 | −0.81 | −0.79 | −0.83 | −0.82 | −0.79 | −0.82 | −0.62 | −0.61 | −0.84 | −0.629 |
| R5/R6 | −0.77 | −0.98 | −0.66 | −0.64 | −0.64 | −0.87 | −0.69 | −0.60 | −0.69 | −0.66 | −0.69 | −0.84 | −0.79 |
| f/CT5 | 7.64 | 8.22 | 7.69 | 8.05 | 7.80 | 8.30 | 7.74 | 7.69 | 8.10 | 8.30 | 7.07 | 7.71 | 7.78 |
| TTL/ImgH | 1.37 | 1.45 | 1.37 | 1.37 | 1.37 | 1.37 | 1.37 | 1.38 | 1.37 | 1.37 | 1.37 | 1.37 | 1.37 |

The present disclosure further provides an imaging device, having a photosensitive element which may be a photosensitive charge-coupled device (CCD) or complementary metal-oxide semiconductor (CMOS) element. The imaging device may be an independent imaging device such as a digital camera, or may be an imaging module integrated in a mobile electronic device such as a mobile phone. The imaging device is equipped with the imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. An imaging lens assembly comprising sequentially, from an object side to an image side along an optical axis, a first lens, a second lens, a third lens, a fourth lens, and a fifth lens,
   wherein the first lens has a positive refractive power, an object-side surface of the first lens is a convex surface, and an image-side surface of the first lens is a convex surface;
   the second lens has a negative refractive power;
   the third lens has a positive refractive power, an object-side surface of the third lens is a convex surface, and an image-side surface of the third lens is a convex surface;
   the fourth lens has a positive refractive power;
   the fifth lens has a negative refractive power, and a surface tilt angle β5 of an object-side surface of the fifth lens at a maximum effective radius satisfies: −20°<β5<5°; and
   the imaging lens assembly has a total effective focal length f and an entrance pupil diameter EPD, wherein the total effective focal length f and the entrance pupil diameter EPD satisfy: f/EPD≤1.9.

2. The imaging lens assembly according to claim 1, wherein an effective focal length f4 of the fourth lens satisfies: $1.8<f/f4<2.5$.

3. The imaging lens assembly according to claim 1, wherein an effective focal length f1 of the first lens and an effective focal length f5 of the fifth lens satisfy: $-2.5<f1/f5\le-2.0$.

4. The imaging lens assembly according to claim 1, wherein an effective focal length f2 of the second lens satisfies: $-1.0<f/f2<-0.5$.

5. The imaging lens assembly according to claim 1, wherein a combined focal length f12 of the first lens and the second lens and an effective focal length f3 of the third lens satisfy: $0<f12/f3<1.0$.

6. The imaging lens assembly according to claim 1, wherein a radius of curvature R1 of the object-side surface of the first lens and a radius of curvature R2 of the image-side surface of the first lens satisfy: $-1.0<(R1+R2)/(R1-R2)<0$.

7. The imaging lens assembly according to claim 1, wherein a radius of curvature R5 of the object-side surface of the third lens and a radius of curvature R6 of the image-side surface of the third lens satisfy: $-1.0<R5/R6<0$.

8. The imaging lens assembly according to claim 1, wherein a center thickness CT5 of the fifth lens satisfies: $7.0\le f/CT5<9.0$.

9. The imaging lens assembly according to claim 1, wherein a distance TTL from the object-side surface of the first lens to an image plane of the imaging lens assembly on the optical axis and half of a diagonal length ImgH of an effective pixel area on the image plane of the imaging lens assembly satisfy: $TTL/ImgH\le1.6$.

10. An imaging lens assembly comprising sequentially, from an object side to an image side along an optical axis, a first lens, a second lens, a third lens, a fourth lens, and a fifth lens, wherein the first lens has a positive refractive power, an object-side surface of the first lens is a convex surface, and an image-side surface of the first lens is a convex surface;

the second lens has a negative refractive power, and a maximum surface tilt angle β2 of an object-side surface of the second lens satisfies: $\beta2<30°$;

the third lens has a positive refractive power, an object-side surface of the third lens is a convex surface, and an image-side surface of the third lens is a convex surface;

the fourth lens has a positive refractive power;

the fifth lens has a negative refractive power, and a surface tilt angle β5 of an object-side surface of the fifth lens at a maximum effective radius satisfies: $-20°<\beta5<5°$; and the imaging lens assembly has a total effective focal length f and an entrance pupil diameter EPD, wherein the total effective focal length f and the entrance pupil diameter EPD satisfy: $f/EPD\le1.9$.

11. The imaging lens assembly according to claim 10, wherein a radius of curvature R1 of the object-side surface of the first lens and a radius of curvature R2 of the image-side surface of the first lens satisfy: $-1.0<(R1+R2)/(R1-R2)<0$.

12. The imaging lens assembly according to claim 10, wherein a total effective focal length f of the imaging lens assembly and an effective focal length f2 of the second lens satisfy: $-1.0<f/f2<-0.5$.

13. The imaging lens assembly according to claim 12, wherein the total effective focal length f of the imaging lens assembly and an effective focal length f4 of the fourth lens satisfy: $1.8<f/f4<2.5$.

14. The imaging lens assembly according to 10, wherein an effective focal length f1 of the first lens and an effective focal length f5 of the fifth lens satisfy: $-2.5<f1/f5\le-2.0$.

15. The imaging lens assembly according to claim 14, wherein a combined focal length f12 of the first lens and the second lens and an effective focal length f3 of the third lens satisfy: $0<f12/f3<1.0$.

16. The imaging lens assembly according to claim 13, wherein a radius of curvature R5 of the object-side surface of the third lens and a radius of curvature R6 of the image-side surface of the third lens satisfy: $-1.0<R5/R6<0$.

17. The imaging lens assembly according to claim 13, wherein the total effective focal length f of the imaging lens assembly and a center thickness CT5 of the fifth lens satisfy: $7.0\le f/CT5<9.0$.

* * * * *